United States Patent [19]

Funatsu et al.

[11] Patent Number: 5,382,899
[45] Date of Patent: Jan. 17, 1995

[54] POSITION DETECTING AND TIME MEASURING DEVICE PROVIDING MEASUREMENT FINER THAN A CLOCK SIGNAL PERIOD

[75] Inventors: Mitsuhiro Funatsu, Nagareyama; Kazuya Sakamoto, Hamura, both of Japan

[73] Assignee: Kabushiki Kaisha SG, Tokyo, Japan

[21] Appl. No.: 978,782

[22] Filed: Nov. 19, 1992

[30] Foreign Application Priority Data

Nov. 22, 1991 [JP]  Japan .................................. 3-332880

[51] Int. Cl.⁶ ..................... G01B 7/14; G08C 19/06
[52] U.S. Cl. ........................ 324/207.18; 324/207.25; 340/870.35
[58] Field of Search ............... 324/207.18, 207.19, 324/207.25, 207.11, 207.23, 207.24; 310/68 B, 168; 318/656–657, 659, 660, 661; 340/870.31, 870.35, 870.36; 336/135

[56] References Cited

U.S. PATENT DOCUMENTS 4,556,886  12/1985  Shimizu et al. ................. 340/870.31
4,612,503  9/1986  Shimizu et al. ................. 324/207.18
5,142,226  8/1992  Sakamoto et al. ............. 324/207.18

*Primary Examiner*—Kenneth A. Wieder
*Assistant Examiner*—Jay M. Patidar
*Attorney, Agent, or Firm*—Graham & James

[57] ABSTRACT

First absolute position detecting section generates an A.C. output signal having a phase electrically shifted in accordance with a position of a moving object, and samples a counted value of a counter circuit in response to an electrical phase change at a zero cross time point of the A.C. output signal, so as to output the sampled counted value of the counter circuit as absolute position data of the moving object. Second absolute position detecting section generates one or more delayed clock signals that are delayed from a clock signal on the basis of which the counter circuit counts up by an amount of time smaller than one period of the clock signal, and utilizes the one or more delayed clock signals to measure the zero cross time point of the A.C. output signal in accordance with a unit time smaller than the one period of the clock signal, so as to output, as the absolute position data, the measured time point after having been added to the sampled counted value.

15 Claims, 12 Drawing Sheets

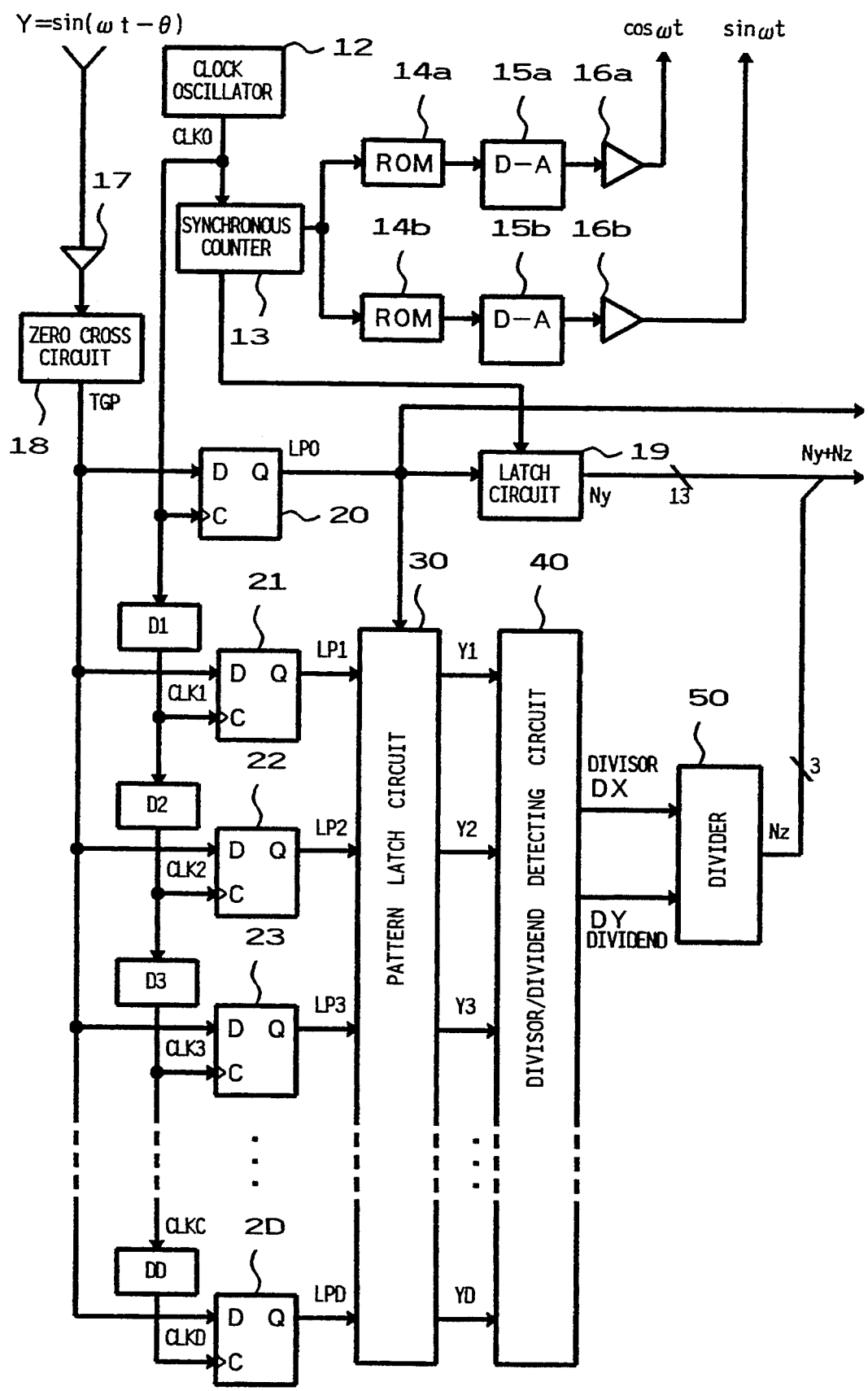
F I G. 1

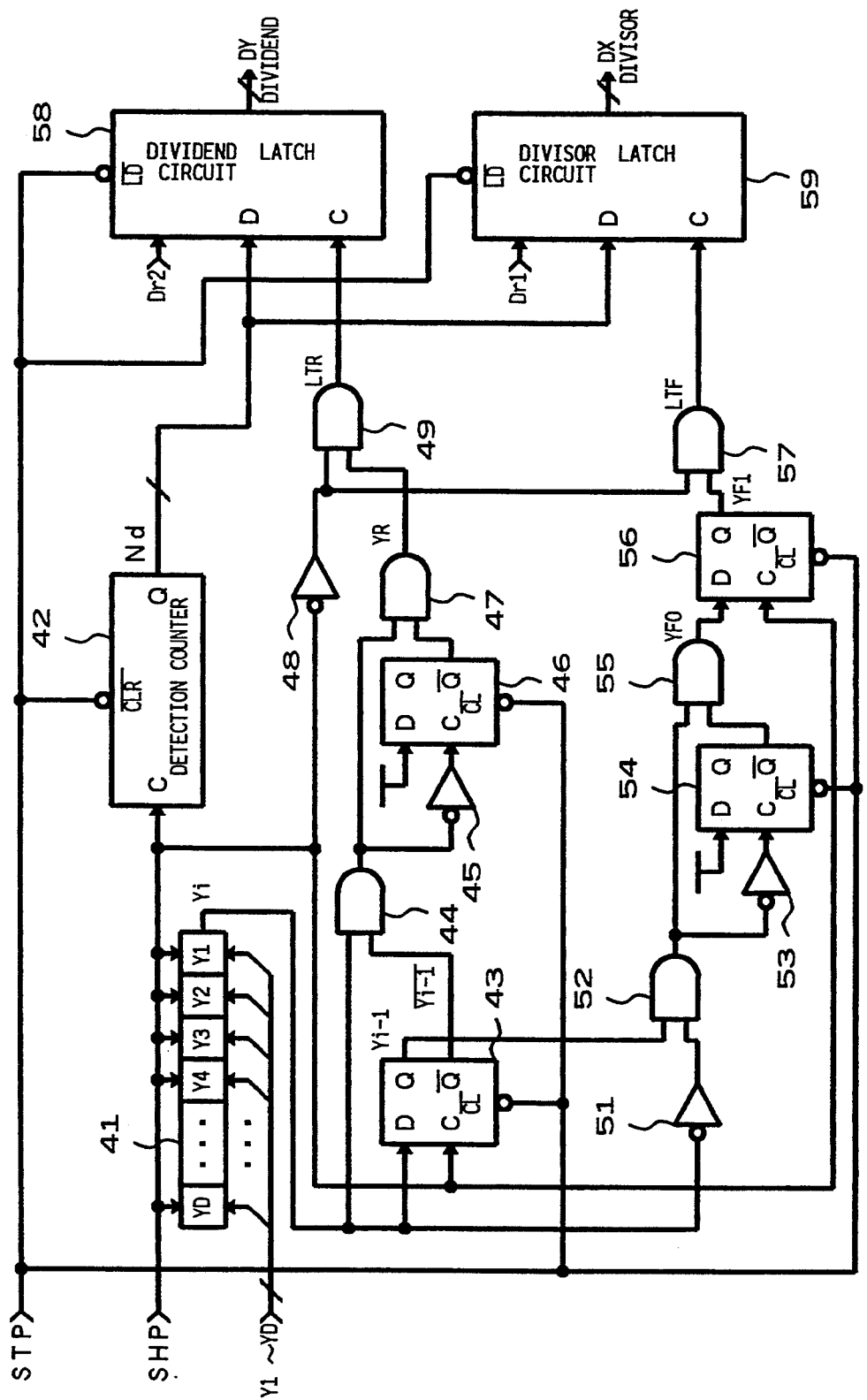
F I G. 5

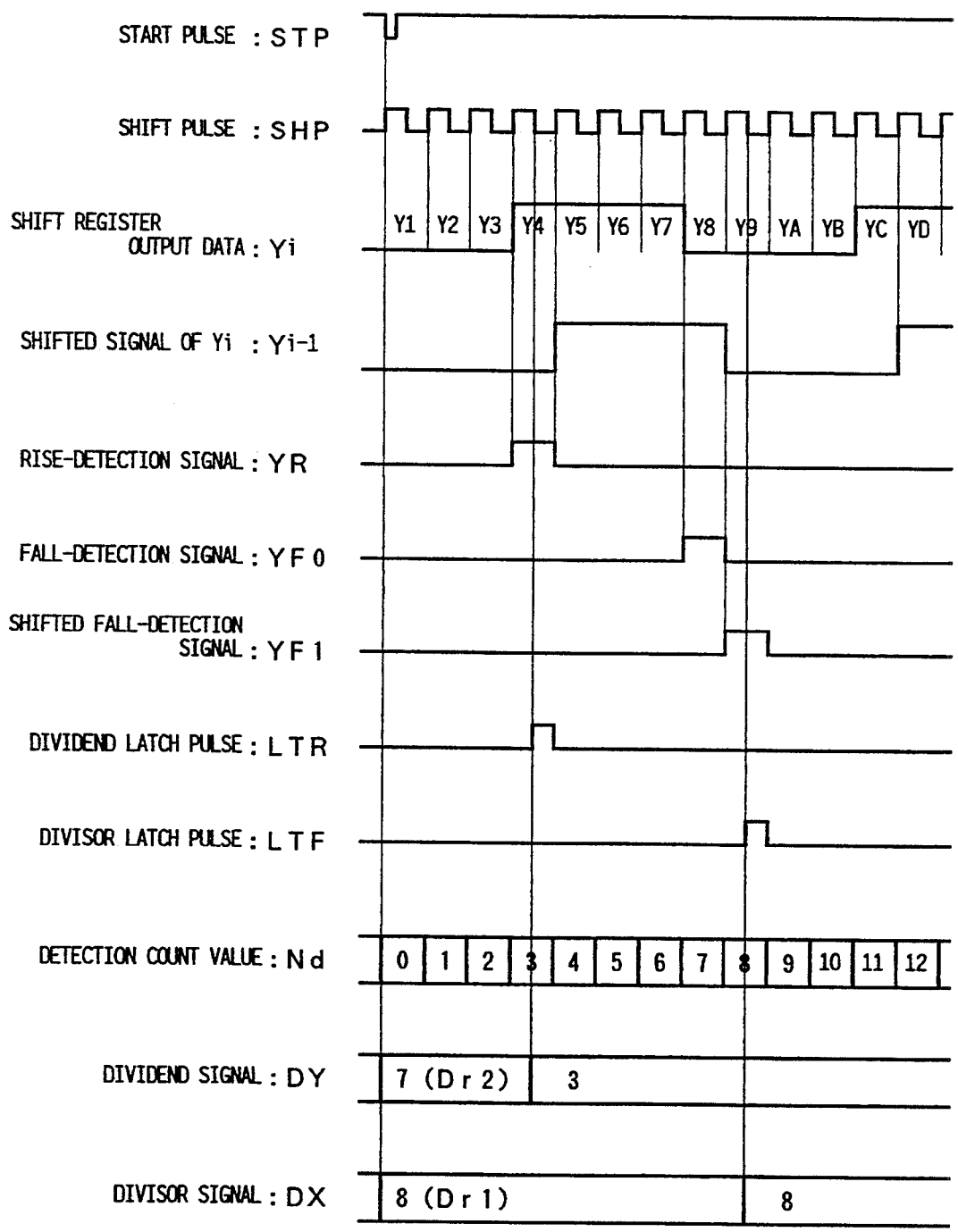
F I G. 6

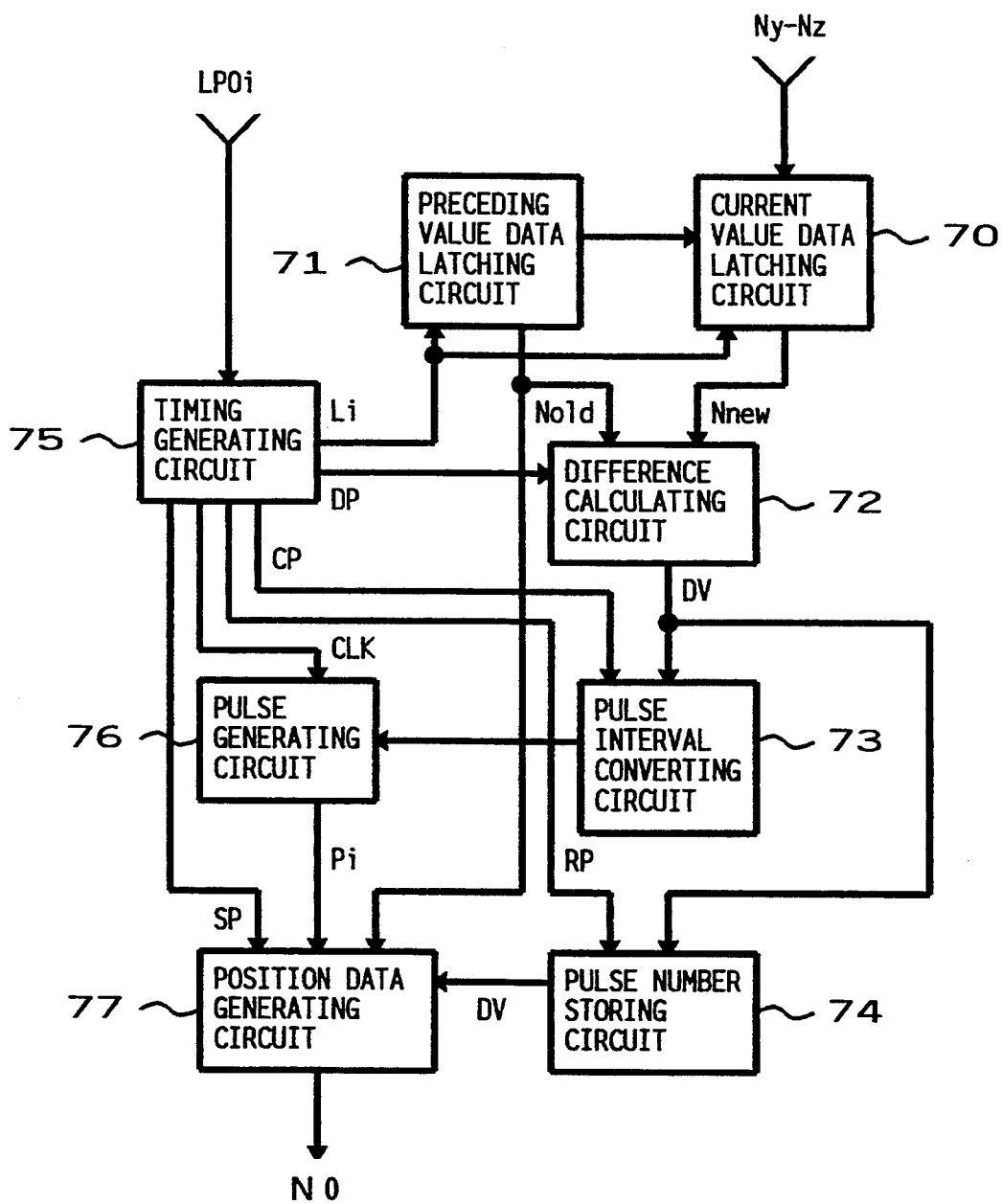
F I G. 7

POSITION DETECTING AND TIME MEASURING DEVICE PROVIDING MEASUREMENT FINER THAN A CLOCK SIGNAL PERIOD

BACKGROUND OF THE INVENTION

The present invention relates to a position detecting device of the phase shift type which detects, as a change in the electrical phase angle of its output A.C. signal, a reluctance change generated by the movement of an object.

The present invention also relates to a time measuring device for measuring a time point at which a specific trigger pulse to be used in such a phase shift-type position detecting device is inputted thereto.

As a position detecting device utilizing a reluctance change, a rotation-type differential transformer called a "microsyn" is conventionally well known in the art. The microsyn transforms a detected rotational position into a voltage level and therefore has the disadvantage that it is susceptible to external disturbances and hence tends to make errors. For example, temperature changes may change coil resistance to create variations in detection signal level. Further, with such a microsyn, level attenuation amount in a signal transmission path extending from the detector to circuitry utilizing the detector's detection signals varies in accordance with the signal transmission distance or length, and level variations due to noise directly result in detection errors.

In view of the above-mentioned problems, there has been proposed a phase shift-type rotational position detecting device which is capable of accurately detecting a rotational position without being affected by its output level fluctuations due to external disturbances (for example, U.S. Pat. Nos. 4,604,575, 4,612,503 and 4,754,220). Also, there has been proposed a phase shift-type linear position detection device which is based on the same principle as the rotational position detecting device (for example, U.S. Pat. Nos. 4,556,886 and 4,717,874).

FIGS. 10 and 11 schematically illustrate the general structure of the proposed phase shift-type rotational position detecting device. In FIG. 10, a sensor section of the rotational position detecting device is shown. The sensor section generally comprises a stator 11a that has a plurality of poles A–D projecting perpendicularly from the rotation axis and also circumferentially spaced from each other by a predetermined interval or angle (90°), and a rotor 11b provided within a stator space sordid by the poles A–D. That is, the stator 11a is provided in opposed relation to the outer surface of the rotor 11b.

The rotor 11b is made of such a material and in such a shape that a change in its rotational angle causes the reluctances of the poles A–D to be changed. In this illustrated example, the rotor 11b is in the form of a cyrinder that is eccentric with respect to the rotation axis. Primary coils 1A–1D and secondary coils 2A–2D are wound around the poles A–D of the stator 11a, respectively. In addition, other coils are wound around the first opposed pair of the poles A, C and the second opposed pair of the poles B, D in such a manner the two pairs may operate in a differential fashion and differential reluctance changes may occur.

The primary coils 1A and 1C wound around the first pair of the poles A and C are excited by sine wave signal $\sin\omega t$, while the primary coils 1B and 1D wound around the second pair of the poles B and D are excited by cosine wave signal $\cos\omega t$, so that composite output signal Y may be obtained from the secondary coils 2A–2D. As best shown in FIG. 12, the composite output signal Y is a signal $Y = \sin(\omega t - \theta)$ that is phase-shifted from first A.C. signal, i.e., reference signal (exciting signal for the primary coils) $\sin\omega t$, by an electrical phase angle corresponding to a rotational angle $\theta$ of the rotor 11b.

In the case where the induction-type, phase shift-type position detecting device as mentioned above is employed, position sensor unit will be needed which comprises a reference signal generating section that generates the first A.C. signal $\sin\omega t$ or $\cos\omega t$, and a phase difference detection section that measures the electrical phase difference $\theta$ of the composite output signal Y to calculate position data indicative of the current position of the rotor 11b.

FIG. 11 illustrates an example of the structure of such a position sensor unit employed in the rotational position detecting device. As shown, the position sensor unit comprises a reference signal generating section that generates reference signals $\sin\omega t$ or $\cos\omega t$, and a phase difference detecting section that detects the phase difference $\theta$ between the composite output signal $Y = \sin(\omega t - \theta)$ and the reference A.C. signal $\sin\omega t$.

In order to detect the phase difference $\theta$, the phase difference detecting section measures a time difference between the reference A.C. signal $\sin\omega t$ and the composite output signal $Y = \sin(\omega t - \theta)$, because the phase difference $\theta$ is a value obtained by multiplying $2\pi$ radian with a rate of a difference between the reference A.C. signal and composite signal Y to one period Tc of the reference A.C. signal. Accordingly, the phase difference detecting section measures, as a count Ny of a synchronous counter, a time difference between the reference A.C. signal $\sin\omega t$ and the composite output signal Y and outputs it as the phase difference $\theta$.

The reference signal generating section generally comprises a clock oscillator 12, a synchronous counter 13, ROM's 14a, 14b, digital-to-analog (D-A) converters 15a, 15b and amplifiers 16a, 16b. The phase difference detecting section comprises an amplifier 17, a zero cross circuit 18 and a latch circuit 19.

The clock oscillator 12 generates reference clock signal CLx at a rapid and accurate frequency, on the basis of which other circuits operate. It is assumed here that the reference clock signal CLx has a frequency fx of 40.96 MHz and a period Tx of about 24.4 ns.

The synchronous counter 13 is a ring or cyclic counter that counts the reference clock signal CLx of the clock oscillator 12 and outputs its count Ny as an address signal to the ROM's 14a, 14b and the latch circuit 19 of the phase difference detecting section. The oscillation frequency fx of the reference clock signal CLx and the maximum cyclic count Nx of the synchronous counter 13 determine the frequency of the reference A.C. signal $\sin\omega t$, namely, primary carrier frequency fc.

If, for example, the oscillation frequency fx of the reference clock signal CLx is 40.96 MHz and the maximum cyclic count Nx of the synchronous counter 13 is 4,096, the primary carrier frequency fc will be 10 kHz (=40.96 MHz÷4,096), and further if the maximum cyclic count Nx is 8,192, the primary carrier frequency fc will be 5 kHz (=40.96 MHz÷8,192). FIG. 12 illustrates the relationships among the reference A.C. signal $\sin\omega t$, composite output signal $Y=\sin(\omega t-\theta)$ and reference clock signal CLx in the case where the maximum cyclic count Nx is 8,192.

The ROM's 14a, 14b store therein amplitude data corresponding to the reference A.C. signals $\sin\omega t$ and $\cos\omega t$ and generate amplitude data of the reference A.C. signals $\sin\omega t$ or $\cos\omega t$ in response to an address signal (count Ny) provided from the synchronous counter 13. More specifically, the ROM 14a stores amplitude data of the reference A.C. signal $\cos\omega t$, while the ROM 14b stores amplitude data of the reference A.C. signal $\sin\omega t$. Accordingly, when the ROM's 14a, 14b are provided with the same address, two kinds of reference A.C. signals $\sin\omega t$ and $\cos\omega t$ are outputted from the ROM's 14a, 14b. It is to be appreciated that two kinds of reference A.C. signals $\sin\omega t$ and $\cos\omega t$ can also be obtained by reading only one of the ROM's 14a, 14b with address signals having different phases.

The D-A converters 15a, 15b convert digital amplitude data read out from the ROM's 14a, 14b into analog signals which are then fed to the respective amplifiers 16a, 16b. The amplifiers 16a, 16b amplify the analog signals fed from the D-A converters 15a, 15b and apply the thus amplified signals as reference A.C. signals $\sin\omega t$ and $\cos\omega t$ to the primary coils 1A, 1C and 1B, 1D, respectively. When the count of the synchronous counter 13 is Nx, the count Nx corresponds to one period Tc (200 $\mu$s) of the reference A.C. signal $\sin\omega t$, $\cos\omega t$, and phase angle change corresponding to a time of Tc/Nx (=24.4 ns) is needed for the synchronous counter 13 to count up by one. This means that the count Nx corresponds to the maximum phase angle, $2\pi$ radian of the reference A.C. signal $\sin\omega t$, $\cos\omega t$, and one count-up of the counter 13 represents a change of rotational position by an angle corresponding to $2\pi/Nx$ radian.

The amplifier 17 amplifies the composite value of secondary voltages induced in the secondary coils 2A-2D and delivers the amplified composite value to the zero cross circuit 18.

The zero cross circuit 18 a zero cross point at which composite output signal (secondary voltage) $Y=\sin(\omega t-\theta)$ induced in the secondary coils 2A-2D of the rotational position detecting device changes from a negative voltage over to a positive voltage, so as to output a trigger pulse TGP to a flip-flop circuit 20.

The flip-flop circuit 20 receives at its clock pulse terminal C the reference clock signal CLx provided from the clock oscillator 12 and receives at its input terminal D the trigger pulse TGP provided from the zero cross circuit 18, so that it outputs a latch pulse LP in synchronization with the rising edge of the reference clock CLx after the trigger pulse TGP has been input. This latch pulse LP is such a pulse that rises when the counted value or count (hereinafter the terms count and counted value will be used for the same meaning) of the synchronous counter 13 is stabilized, i.e., in the middle of its count-up operation.

At a time point when the latch pulse LP has been input, the latch circuit 19 latches the counted value Ny of the synchronous counter 13 which has been initiated in response to reference clock signal fx at the rise of the reference A.C. signal. Accordingly, the counted value Ny as latched in the latch circuit 19 accurately represents the time difference, namely, phase difference between the reference A.C. signal and the composite output signal (composite secondary output).

In clearer terms, the composite output signal $Y=\sin(\omega t-\theta)$ is delivered to the zero cross circuit 18, which outputs a trigger pulse TGP to the flip-flop circuit 20 in synchronism with the timing when the amplitude of the composite output signal Y changes from a negative voltage to a positive voltage. The flip-flop circuit 20 gives the latch circuit 19 a latch pulse LP which is synchronous with the rise of a reference clock pulse CLx, upon which the latch circuit 19 latches the counted value Ny of the synchronous counter 13 in response to the rise of the latch pulse LP as shown in FIG. 12.

At that time, because one cyclic period of the synchronous counter 13 is coincident with one period of the sine wave signal $\sin\omega t$, the latch circuit 19 latches such a counted value Ny that corresponds to the time difference between the reference A.C. signal and the composite output signal $Y=\sin(\omega t-\theta)$. Therefore, the latch circuit 19 outputs the thus-latched counted value Ny as digital position data. Then, by multiplying this digital position data Ny by $2\pi/Nx$, rotational position of the rotor 11b in its rotation direction can be calculated.

In this manner, the phase shift-type position detecting device employs a counter circuit to measure a time difference corresponding to a phase difference $\theta$ between the reference A.C. signal $\sin\omega t$ and the composite output signal $Y=\sin(\omega t-\theta)$, and then provides the counted value of the counter circuit as rotational position data.

As mentioned above, the phase shift-type position detecting device latches a counted value of the synchronous counter 13 at a time when the flip-flop circuit 20 outputs a latch pulse LP after the zero cross circuit 18 has output a trigger pulse TGP, and then outputs the latched counted value as position data Ny.

Namely, if the oscillation frequency fx of the clock oscillator 12 shown in FIG. 12 is 40.96 MHz and the circulation counted value Nx of the synchronous counter 13 is 8,192, the phase shift-type position detecting device outputs, every 0.2 ms (200 $\mu$s), position data having a detection accuracy (resolution) corresponding to one rotation ($2\pi$ radian) as divided by 8,192. Or, if the oscillation frequency fx of the clock oscillator 12 is 40.96 MHz and the circulation counted value Nx of the synchronous counter 13 is 4,096, the phase shift-type position detecting device outputs, every 0.1 ms (100 $\mu$s), position data having a detection accuracy (resolution) corresponding to one rotation ($2\pi$ radian) as divided by 4,096.

Since, as mentioned earlier, the detection accuracy (resolution) of the position detecting device is a value dependent on the circulation count value Nx of the synchronous counter 13, detection accuracy can be improved by simply increasing the circulation count value Nx. But, in such a case, simply increasing the circulation count value Nx results in an increase in output period of the position data (decrease in primary carrier frequency fc), and hence the device can not be utilized in a realtime position control system etc. In order to increase the maximum count value Nx without the primary carrier frequency fc being decreased, it suffices only to increase the oscillation frequency fx of the reference clock signal CLx. However, if the oscillation frequency fx is set to be more than twice about 40 MHz, substantially no electronic components (counter circuit etc.) will operate accurately at such a high frequency, and hence as a matter of fact it is not feasible to increase the oscillation frequency fx of the reference clock signal CLx.

Therefore, with the position detecting device today, the oscillation frequency fx of the reference clock signal CLx is set at 40.96 MHz and the circulation count value Nx is set at 8,192 or 4,096, with the primary carrier frequency fc being set at 5 or 10 KHz.

As the result, the following problems are encountered when such a phase shift-type rotational position detecting device is mounted on the rotation shaft of a motor.

FIG. 13 illustrates a relationship between reference A.C. signal sinω t and associated composite output signal Y employed in such a phase shift-type rotational position detecting device.

In response to angular movement of the motor, the phase difference $\theta$ between the reference A.C. signal sin ω t and the composite output signal Y gradually becomes greater as indicated by $\theta, 2\theta, 3\theta$ .... This phase difference $\theta$ corresponds to counted value Ny of the synchronous counter 13 that is sampled every 0.2 ms in synchronism with latch pulse LP, and it also represents a value dependent on the rotation speed of the motor. Thus, as the rotation speed of the motor (rotation shaft) increases, the phase difference $\theta$ becomes greater, while as the rotation speed decreases, the phase difference $\theta$ becomes smaller.

Referring to FIG. 13, position data DA4–DA0 represent the lower five bits of position data Ny output from the latch circuit 19 when the primary carrier frequency fc is 5 KHz and the rotation speed of the motor is 30 rpm, and position data DB4–DB0 represent the lower five bits of position data Ny output from the latch circuit 19 when the primary carrier frequency fc is 5 KHz and the rotation speed of the motor is 40 rpm.

If the primary carrier frequency fc is 5 KHz and the rotation speed of the motor is 30 rpm, rotational position data indicative of rotational movement for 0.2 ms take a value of $2\pi \times 30 \div (60 \times 5,000) = \pi/5,000$ radian, and rotational position data corresponding to one count of the synchronous counter 13 takes a value of $\pi/8,192$ ($=\pi/4,096$). Thus, in this case, the rotational position data indicative of rotational movement for 0.2 ms is smaller in value than the rotational position data corresponding to one count of the synchronous counter 13. In other words, time difference corresponding to the phase difference $\theta$ between reference A.C. signal sinω t and composite output signal Y is smaller than the period Tx of the oscillation frequency fx.

Accordingly, even if the position detecting device outputs position data in response to latch pulse LP, the position data may have some unchanged portion. For example, for 0th and first latch pulses LP, position data DA4–DA0 are "00000"; for fifth and sixth latch pulses LP, position data DA4–DA0 are "00100"; for eleventh and twelfth latch pulses LP, position data DA4–DA0 are "01001"; and for sixteenth and seventeenth latch pulses LP, position data DA4–DA0 are "01101". Likewise, for both twenty-first and twenty-second latch pulses LP, and twenty-sixth and twenty-seventh latch pulses LP, position data DA4–DA0 are not changed.

Although the motor is actually caused to continuously rotate at a given speed (30 rpm in this case), there are produced changed and unchanged portions in the position data outputted every 0.2 ms. This is because the time difference corresponding to the phase difference $\theta$ between reference A.C. signal sinω t and composite output signal Y is smaller than the period Tx of the oscillation frequency fx. Therefore, the position data apparently shows the motor is not in rotational movement, although the motor is actually caused to continuously rotate at a given speed (30 rpm in this case).

On the other hand, if the primary carrier frequency fc is 5 KHz and the rotation speed of the motor is 40 rpm, the rotational position data corresponding to one count of the counter 13 takes a value of $\pi/4,096$ radian, but the rotational position data indicative of rotational movement within 0.2 ms takes a value of $2\pi \times 40 \div (60 \times 5,000) = \pi/3,750$ radian that is greater than the value taken when the rotation speed is 30 rpm. That is to say, in the case where the rotation speed is 40 rpm, the rotational position data indicative of rotational movement within 0.2 ms is greater in value than the rotational position data corresponding to one count of the counter 13, and the time difference corresponding to the phase difference $\theta$ between reference A.C. signal sinωt and composite output signal Y is greater than the period Tx of the oscillation frequency fx. Accordingly, the synchronous counter 13 counts up from the previous count at least once each time latch pulse LP is output. Thus, contrary to the above-mentioned case where the rotation speed is 30 rpm, position data Ny is output which changes its value in response to each latch pulse LP.

It should be understood that, in the case where the oscillation frequency fx of the clock oscillator 12 is 40.96 MHz and the primary carrier frequency fc is 5 KHz, rotational position data indicative of rotational movement within 0.2 ms is greater in value than the rotational position data corresponding to one count of the counter 13, $2\pi/8,192 > 2\pi \times Nr \div (60 \times 5,000)$ and hence the rotation speed $Nr < 60 \times 5,000 \div 8,192 \approx 36.6$ rpm.

Similarly, in the case where the oscillation frequency fx of the clock oscillator 12 is 40.96 MHz and the primary carrier frequency fc is 10 KHz, the phenomenon occurs when the rotational position data indicative of rotational movement within 0.1 ms is greater in value than the rotational position data corresponding to one count of the counter 13, $2\pi/4,096 > 2\pi \times Nr \div (60 \times 10,000)$ and hence the rotation speed $Nr < 60 \times 10,000 \div 4,096 \approx 146.5$ rpm.

As the result, when there is produced any unchanged portion in the position data output in response to each latch pulse LP despite the fact that the motor is continuously rotating at a given speed, it is observed from the position data as if the motor rotation speed is fluctuating, which becomes a significant problem in carrying out control of the rotation speed of the motor or positioning control.

It should now be appreciated that the clock oscillator 12, synchronous counter 13, latch circuit 19 and flip-flop circuit 20 shown in FIG. 11 together constitute a time measuring device which counts reference clock pulses generated by a crystal oscillator or the like and thereby measures a output time point at which trigger pulse TGP is output.

More specifically, the prior art time measuring device counts reference clock pulses having a frequency fx of about 40 MHz which are generated by crystal oscillator or the like, detects a count value corresponding to a time to be measured (in this case, output timing of the trigger pulse TGP), and measures the time on the basis of the counted value (i.e., by multiplying the counted value by one period of the reference clock signal).

However, the minimum unit time detectable by the device is dependent on the oscillation frequency fx of the reference clock signal CLx. For example, if the oscillation frequency fx is 40.96 MHz, one period of the reference clock signal is about 24.4 ns. Therefore, by doubling the oscillation frequency fx, for example, said one period, namely, minimum measurable time unit can be halved for higher resolution. But, when the oscillation frequency is increased more than twice as high as about 40 MHz, few electronic components (counter circuit etc.) can accurately operate at that frequency, and so it is impossible or difficult to achieve a higher resolution measurement.

SUMMARY OF THE INVENTION

It is therefore the primary object of the present invention to provide a phase shift type position detecting device which, in detecting a position of a moving object, can highly improve detection accuracy (or resolution) of position data output with predetermined period.

It is the second object of the present invention to provide a time measuring device which is capable of measuring a time using a unit time smaller than a time corresponding to one count of a counter circuit that counts reference clock signal generated by an crystal oscillator or the like.

In order to achieve the first object, a position detecting device according to the invention comprises a first absolute position detecting section of a phase shift type for generating an A.C. output signal having a phase electrically shifted in accordance with a position of a moving object, and sampling a counted value of a counter circuit in response to an electrical phase change at a zero cross time point of the A.C. output signal, so as to output the sampled counted value of the counter circuit as absolute position data of the moving object, and a second absolute position detecting section of a phase shift type for generating one or more delayed clock signals delayed by an amount of time smaller than one period of a clock signal on the basis of which said counter circuit counts up, for utilizing the one or more delayed clock signals to measure the zero cross time point of the A.C. output signal in accordance with a unit time smaller than the one period of the clock signal, and for outputting, as said absolute position data, the measured time point after having been added to said sampled counted value.

In this position detecting device, the A.C. output signal is electrically phase-shifted in accordance with a moved position of the moving object (which is a rotationally moving object or linearly moving object). On the basis of the electrically phase-shifted A.C. output signal, the position detecting device detects a rotational position of the rotationally moving object if it is designed as a rotational position detecting device, or a linear position of the linearly moving object if it is designed as a linear position detecting device. Namely, the first absolute position detecting section samples a counted value of a counter in response to a phase change at a zero cross time point of the A.C. output signal, and outputs the thus-sampled counted value of the counter circuit as rotational or linear position data of the moving object.

Unit time measurable by the first absolute position is one period of the reference clock signal on the basis of which the counter means operates to count up. So, the second absolute position detecting section generates one or more delayed clock signals which are delayed from the reference clock signal by a time smaller than one period of the reference clock signal. More specifically, the second absolute position detecting section delays the reference clock signal by means of a delay section to generate a plurality of delayed clock signals within the one period of the reference clock signal. The delayed clock signals constitute a group of delayed clock signals that have rising and falling edges sequentially delayed with respect to the reference clock signal.

The second absolute position detecting section detects, from among the plural delayed clock signals, one having a rising or falling edge closest of all to the zero cross time point of the A.C. output signal, and thereby can measure the zero cross time point with a unit time smaller than the one period of the reference clock signal. Then, the second absolute position detecting section outputs the time that has been measured with unit time smaller than the one period of the reference clock signal after the measured time having been added to the sampled counted value sampled as said absolute position data. In this manner, by the second absolute position detecting section, time corresponding to one count of the counter section that counts the reference clock signal can be measured with higher resolution. With such arrangements, the position detecting device according to the first aspect of the present invention, when detecting a position of the moving object, can highly increase the detection accuracy of position data outputted with a predetermined period.

Further, in order to achieve the second object of the invention, a time measuring device according to the second aspect of the present invention comprises a clock oscillator section for generating a clock signal having a repetition of first and second level changes, a counter section that counts up in response to the first level change of the clock signal, a latch pulse generator section for outputting a latch pulse in response to first detected one of said second level change since the trigger pulse has been inputted to the latch pulse generator section, a holding section for holding a value being counted by said counter section when the latch pulse is inputted to the holding section, and outputting the held value as a part of data indicating when the trigger pulse is inputted, a delay section comprising a plurality of delay circuits connected in series with each other, each of said delay circuits outputting a delayed clock signal that is delayed from the clock signal by an amount of time smaller than one period of the clock signal, and a time detecting section for receiving a plurality of the delayed clock signals from said delay section, and for performing a division of dividing the number of the delayed clock signals having a delay time smaller than one period of the clock signal and also having said second level change of the clock signal prior to input timing of the trigger pulse, by the number of said delayed clock signals having a delay time smaller than the one period of the clock signal, so that the time detecting section outputs, as the part of data indicating when the trigger pulse is inputted, a result of the division after having been added to the value held by said holding circuit.

The conventional time measuring devices, in general, measure an input timing of a trigger pulse only by performing, through a counter section, a count-up of a reference clock signal generated by crystal oscillator or the like, sampling the counted value in response to the input timing of a trigger pulse, and multiplying the sampled counted value by one period of the reference clock signal. Because of such simple arrangements, it is impossible to measure an input timing of a trigger pulse with a unit time smaller than one period of the reference clock signal.

Namely, the conventional time measuring devices comprises a clock oscillator, counter, latch pulse generator and holding circuit. The clock oscillator generates a clock signal having a repetition of the first and second level changes. The level changes are a rising change in a direction from low level "0" to high level "1" and a falling change in the opposite direction. Therefore, the first level change is the rising change if the second level change is the falling change, and vice versa. The counter performs a count-up in response to the first level change of the clock signal. The latch pulse generator outputs a latch pulse at a time point when it detects the second level change of the first clock signal after the input of the trigger pulse. The holding circuit holds the value being counted by the counter at the input timing of the latch pulse and then outputs the thus-held counted value as a part of data indicative of the input timing of the trigger pulse.

In contrast, the above-mentioned time measuring device employs a novel structure comprising a clock signal delay section and a time detecting circuit, in order to measure the input timing of an trigger pulse with a unit time smaller than one period of the reference clock signal. The clock signal delaying section is composed of a plurality of serially connected delay circuits, each of which outputs a delayed clock signal delayed from the reference clock signal by a time smaller than one period of the reference clock signal. Consequently, a plurality of delayed clock signals outputted from the delay section constitute a group of delayed clock signals having the first and second level changes sequentially delayed with respect to the reference clock signal. Among these delayed clock signals, some signals may have a delay time smaller than one period of the reference clock signal and other may have a delay time greater than one period of the reference clock signal.

The time detecting section receives the plurality of delayed clock signals from said delay section, and dividing, by the number of the delayed clock signals of a delay time smaller than the one period of the clock signal (divisor), the number of the delayed clock signals a delay time smaller than the one period of the clock signal and also having the second level change before the trigger pulse is inputted (dividend). Namely, because the divisor is the number of the delayed clock signals of a delay time smaller than the one period of the reference clock signal and existing within the one period of the reference clock signal, a value obtained by dividing the one period of the reference clock signal by the divisor represents the delay time of the delayed signal signals. Further, because the dividend is the number of the delayed clock signals existing before the input time of the trigger pulse, a value obtained by multiplying the delay time of the delayed clock signals by the dividend represents the input timing of the trigger pulse within the one period of the reference clock signal. Therefore, by multiplying the quotient between the divisor and dividend by the one period of the reference clock signal, the input time of the trigger pulse within the one period is accurately calculated. So, the time detecting section outputs, as a part of data indicative of the input timing of the trigger pulse, the value obtained by division between the divisor and the dividend after having been added the counted value held by the holding section. With such arrangements, the time measuring device can perform a time measurement with a unit time smaller than a time corresponding to one count of the counter section.

The preferred embodiments of the present invention will be described in greater detail below with reference to the accompanying drawings.

BRIEF DESCRIPTION OF THE DRAWINGS

In the drawings:

FIG. 1 is a block diagram showing an example hardware structure of a position sensor unit according to one embodiment of the present invention;

FIG. 5 is a block diagram showing in detail an example structure of a divisor/dividend detecting circuit shown in FIG. 1;

FIG. 6 is a timing chart explanatory of how the divisor/dividend detecting circuit of FIG. 5 operates;

FIG. 7 is a block diagram showing in detail an example structure of a position data generator which is capable of reliably providing position data without causing any slip-out phenomenon;

DETAILED DESCRIPTION OF THE PREFERRED EMBODIMENTS

Figure 2:
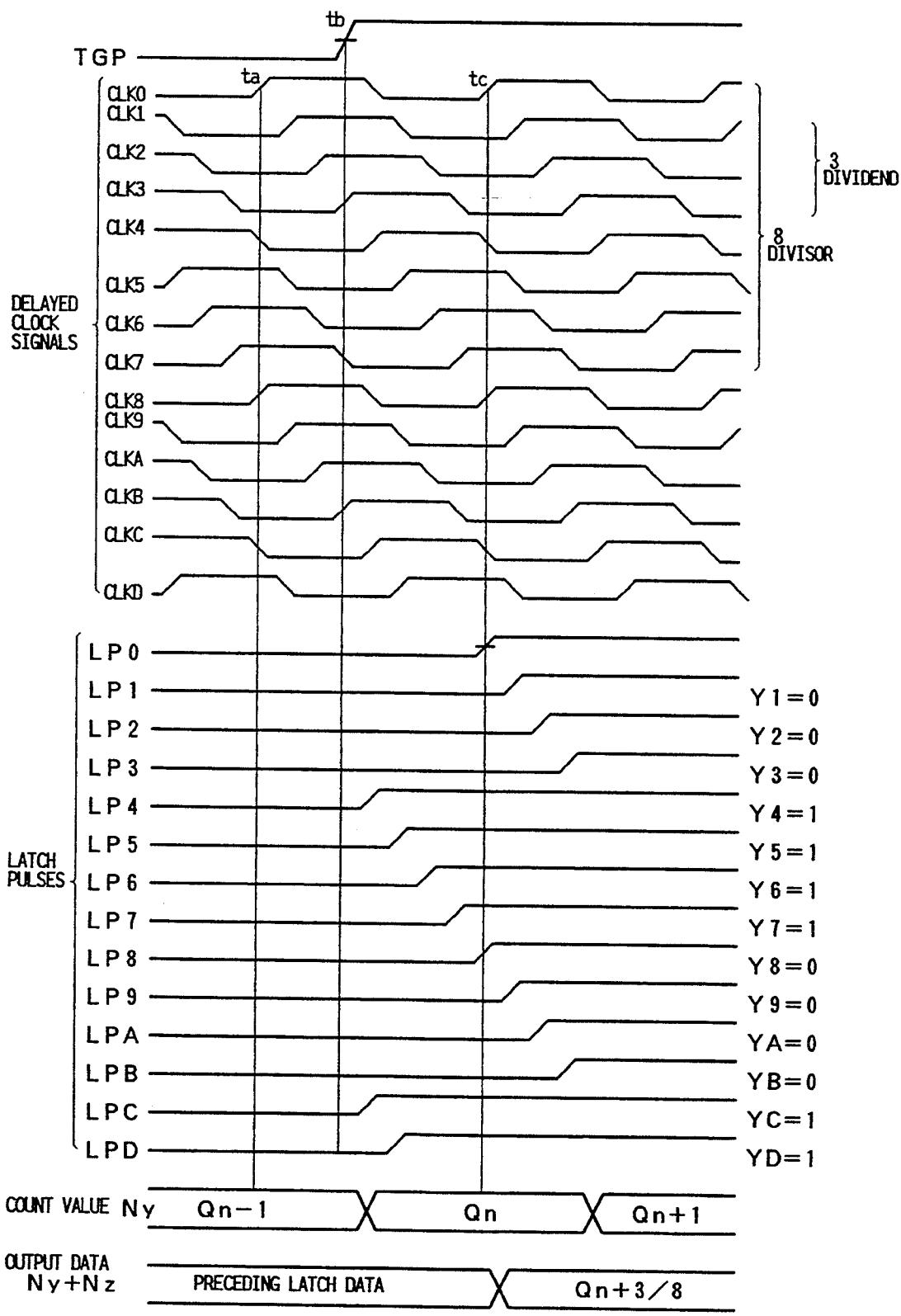
FIG. 2 is a first timing chart explanatory of how the position sensor unit shown in FIG. 1 operates when delay time achieved by delay elements is about 3 ns.
Figure 11:
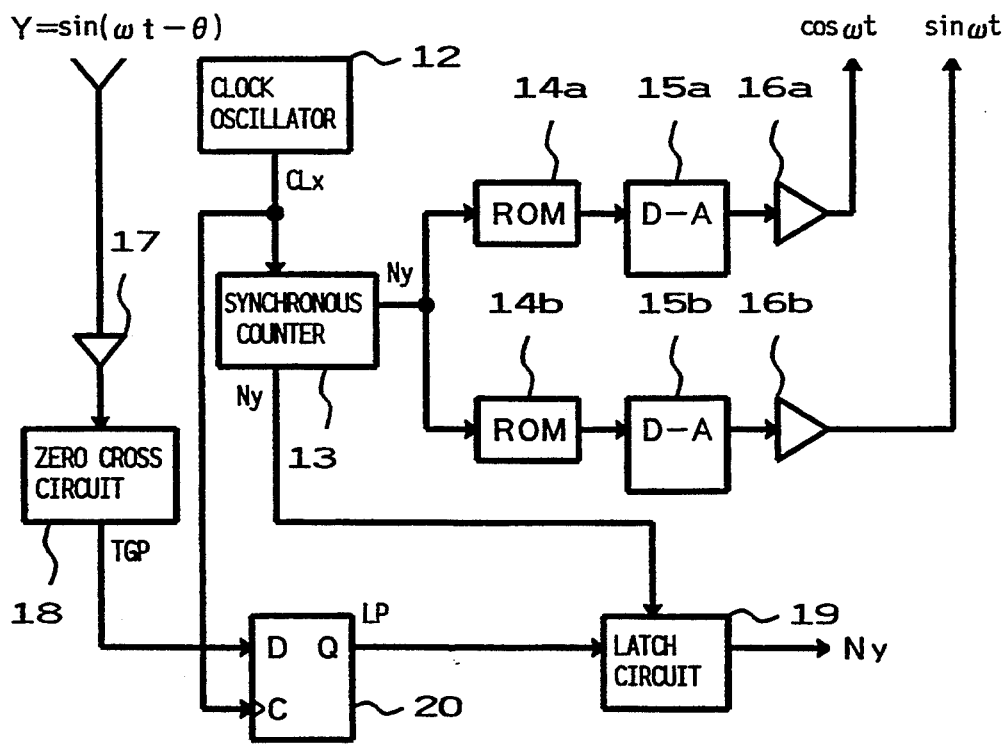
FIG. 11 is a block diagram illustrating an example position sensor unit connected to the rotational position detecting device of FIG. 10.
Figure 12:
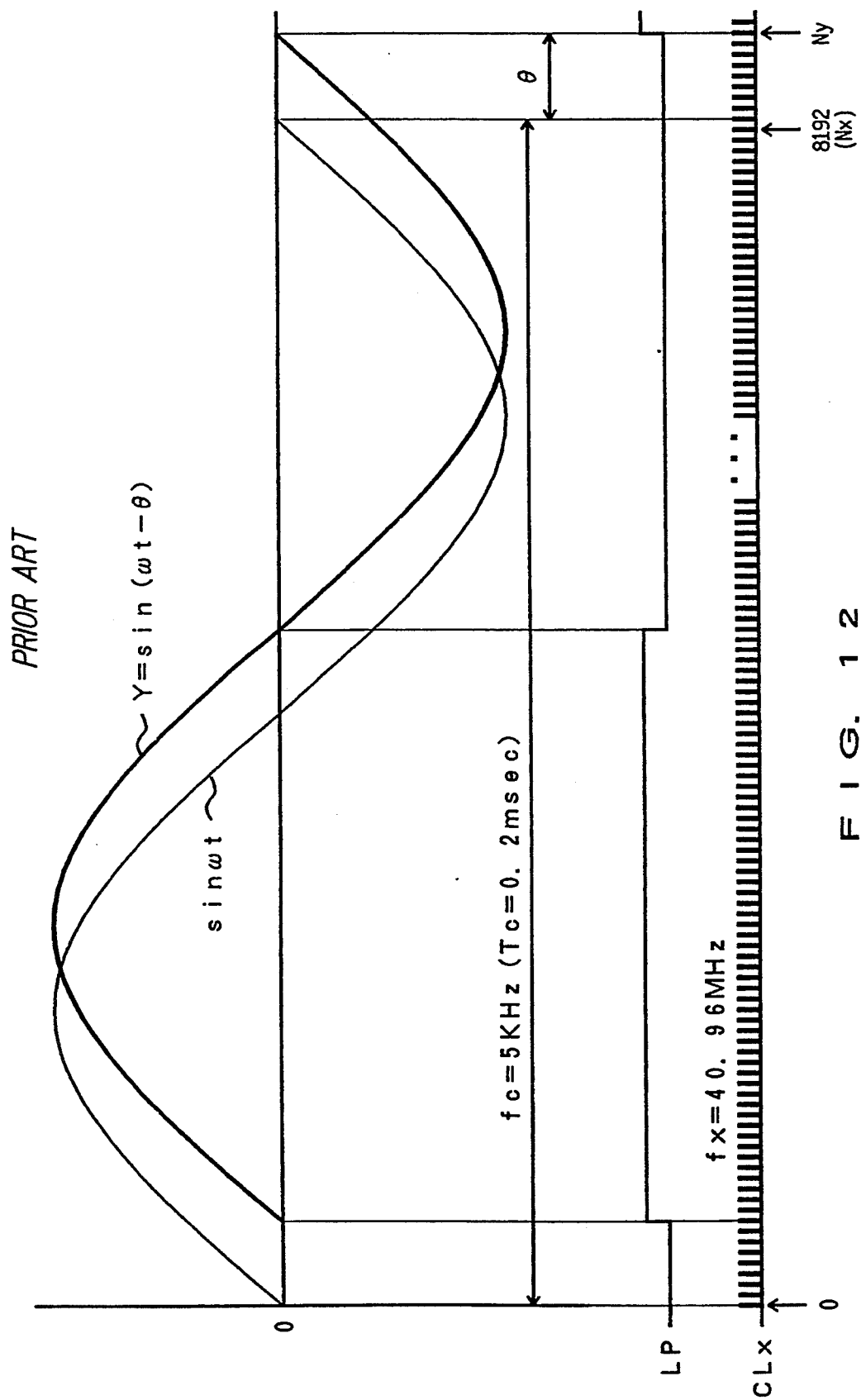
FIG. 12 is a diagram explanatory of the basic principle of the rotational position detecting device of FIG. 10.

FIG. 1 is a block diagram showing an example hardware structure of a position sensor unit according to one embodiment of the present invention, and this figure corresponds to FIG. 11 showing the prior art structure. In FIG. 1, components of same structures as in FIG. 11 are denoted by same reference characters as in FIG. 11 and will not be described here to avoid redundancy. FIG. 2 is a timing chart explanatory of how the position sensor unit shown in FIG. 1 operates.

The position sensor unit according to this embodiment is different from the prior art position sensor unit in that it has a novel time measuring circuit which is capable of more accurately detecting an output timing of trigger pulse TGP in accordance a unit time smaller than a conventional time measuring circuit (synchronous counter 13 and latch circuit 19) which detects an output timing of trigger pulse TGP in accordance with the cycle of reference clock signal CLx. This embodiment will be described in connection with such a case where frequency fx of the reference clock signal CLx is 40.96 MHz (cycle is 24.4 ns) and an output timing of trigger pulse TGP detected in accordance with a unit time that is one eighth of the cycle (approximately 3 ns).

As opposed to the conventional time measuring circuit for measuring an output timing of trigger pulse TGP which is composed of a synchronous counter 13, flip-flop circuit 20 and latch circuit 19, the time measuring circuit according to this embodiment includes, in addition to these components 13, 20 and 19, thirteen delay elements D1–DD, thirteen flip-flop circuits 21–2D, a pattern latch circuit 30, a divisor/dividend detecting circuit 40 and a divider 50.

The flip-flop circuit 20 has a clock terminal C for receiving reference clock signal CLKO of a clock oscillator 12 and also has a D terminal for receiving trigger pulse TGP generated from a zero cross circuit 18, so that the circuit 20 outputs latch pulse LPO in synchronism with the rising edge of a reference clock signal CLKO received after a trigger pulse has been input to the D terminal. The synchronous counter 13 performs its count-up action in synchronism with the falling edge of a reference clock signal CLKO. Thus, the latch pulse LPO output from the flip-flop circuit 20 rises when count value of the synchronous counter 13 has stabilized, i.e., exactly at the halfway point tc of in the count-up action, so that, in a similar fashion to the prior art, the latch circuit 19 output count values Ny one after another which has been counted up by the counter 13.

Each of the delay elements D1–DD comprises a plurality of serially connected inverter elements such as gate arrays. Each of the serially connected inverter elements normally delays an input signal by 0.7 ns and each of the delay elements D1–DD is composed of four stages of such serially connected inverter elements. Accordingly, each of the delay elements D1–DD will delay each of input clock signals CLKO–CLKC by about 3 ns. Of course, the delay element may be in the form of any other gate circuit than inverter circuit.

The delay element D1 receives a reference clock signal CLKO, delays this signal CLKO by about 3 ns behind its rise time point ta, and then outputs the delayed signal as a delayed clock signal CLK1 to the flip-flop circuit 21 and the next delay element D2. In a similar manner, the delay element D2 receives the delayed clock signal CLK1 from the element D1, delays this signal CLK1 by about 3 ns, and then outputs the delayed signal as a delayed clock signal CLK2 to the flip-flop circuit 22 and the next delay element D3. The delay element D3 operates in a similar manner to output a delayed clock signal CLK3 to the still next delay element and flip-flop circuit. Thus, from the delay elements D1–DD are provided a group of delayed clock signals CLK1–CLKD as shown in FIG. 2. Because each of the delay elements D1–DD the respective input reference clock signal CLx by 3, timing of delayed clock signal CLK8 almost coincides with that of reference clock signal CLKO as may be seen from FIG. 2.

The flip-flop circuits 21–2D receive at their D terminals a common trigger pulse TGP from the zero cross circuit 18 and receive at the clock terminals C the respective delayed clock signals, in such manner that each of the flip-flop circuits 21–2D is set to a high level "1" in synchronism with the rising edge of the respective delayed clock signal CLK1–CLKD received at its clock terminal C after the rise time point tb of trigger pulse TGP generated from the zero cross circuit 18.

Output signals of the individual flip-flop circuits 21–2D are as shown in FIG. 2 by "Latch Pulse Group" LP1–LPD.

The pattern latch circuit 30 receives the latch pulse LPO provided from the flip-flop circuit 20, as well as the latch pulse group LP1–LPD provided from the flip-flop circuits 21–2D. The pattern latch circuit 30 latches the latch pulse group LP1–LPD at the rise time point of the latch pulse LPO and then provides the divisor/dividend detecting circuit 40 with pattern output data Y1–YD of high level "1" or low level "0".

As long as the delay elements D1–DD operate in a constantly stabilized manner, the number of the delay elements may be the same as the division number (in this case, 8) by which one cycle Tx of reference clock signal CLK0 is divided to define the unit time. However, in practice, the inverter elements making up the delay elements D1–DD are extremely sensitive to various fluctuations in environment such as temperature and supply voltage, and thereby their delay time may change over a range of ±5%. Therefore, even when there are provided the same number of delay elements as the division number, accurate measurement of a generation time tb of trigger pulse TGP is prevented due to the delay time fluctuation. The divisor/dividend detecting circuit 40 is therefore provided in this embodiment for permitting accurate measurement of a generation time tb of trigger pulse TGP even when the delay time achieved by the delay elements D1–DD.

On the basis of the pattern output data Y1–YD corresponding to the latch pulse group LP1–LPD, the divisor/dividend detecting circuit 40 detects, from among the group of delayed clock signals CLK1–CLKD by the flip-flop 21–2D, a total number DX (divisor) of such delayed clock signals that have a delay time smaller than one cycle Tx of reference clock signal CLK0. Then, the divisor/dividend detecting circuit 40 further detects, from among the group of delayed clock signals CLK1–CLKD, a total number DY (dividend) of such delayed clock signals that have a rise time before the rise time tb of the trigger pulse TGP generated by the zero cross circuit 18. In this manner, the detecting circuit 40 outputs divisor signal DX and dividend signal DY to the divider 50.

In other words, the divisor/dividend detecting circuit 40 regards the pattern output data Y1–YD as a train of serial data, and determines as a divisor DX the number of the pattern data outputted during such a time when level of the serial data changes from high level "1" to low level "0", and determines as a divisor DX the number of the low level "0" pattern data outputted during such a time when level of the serial data changes from high level "1" to low level "0" and also appearing before the high level "1". This divisor DX corresponds to the above-mentioned division number of one cycle of reference clock signal CLK0, and the dividend DY is representative of at which division or segment of the divided cycle Tx the trigger pulse TGP has risen.

The divider 50 divides the dividend DY by the divisor DX and output the result DY/DX as three-bit quotient data Nz. In the example of FIG. 2, the divider 50 outputs "011" as such quotient data Nz.

In this manner, the sensor unit ultimately outputs, as position data, 16-bit position data Ny+Nz whose upper 13-bit is 13-bit count value data Ny provided from the latch circuit 19 and whose lower 3-bit is 3-bit quotient data Nz provided from the divider 50. Value Tx (Ny+Nz) which is obtained by multiplying the position data Ny+Nz by one period Tx represents a time lapsed before the rise time tb of trigger pulse TGP which corresponds to the time difference between the reference A.C. signal and the composite output signal, and value Tx·Nz which is obtained by multiplying value Nz=DY/DX (i.e., value obtained by dividing dividend DY by divisor DX) by one period Tx of the reference clock signal CLK0 represents a time that can not be measured by conventional techniques, i.e., a time from the rise time ta of the reference clock signal CLK0.

Now, the operation of the embodiment will be described in detail with reference to FIG. 2.

In FIG. 2, reference clock signal CLK0 is a clock signal output directly from the clock oscillator 12, and delayed clock signal CLK1 is a clock signal obtained by passing the reference clock signal CLK0 through the delay element D1. Similarly, delayed clock signals CLK2–CLKD are clock signals by passing the reference clock signal CLK0 through the delay elements D2–DD, respectively.

Accordingly, in response to the output of the reference clock signal CLK0 from the clock oscillator 12, a group of the delayed clock signals CLK1–CLKD which are different in timing from each other by about 3 ns is output from the delay elements D1–DD.

Because delay time of each of the delay elements D1–DD is normally about 3 ns, the delayed clock signal CLK8 substantially coincides in timing with the reference clock signal CLK0, and the delayed clock signals CLK1–CLK5 substantially coincide in timing with the delayed clock signals CLK9–CLKD, as shown in FIG. 2.

Now, assume a case where, while the delayed clock signals CLK1–CLKD are provided from the respective delay elements D1–DD and are input to the corresponding flip-flop circuits 21–2D, a trigger pulse TGP from the zero cross circuit 18 has risen at the time point tb between the rise time point ta and rise time point tc of the reference clock signal CLK0. In such a case, the corresponding flip-flop circuits 20–2D output a group of latch pulses LP0–LPD as shown in the lower half portion of FIG. 2.

After the rise time point tb of the trigger pulse TGP, the latch pulse LP0 output from the flip-flop circuit 20 rises at the time point tc in synchronism with the rise of the reference clock signal CLK0. Likewise, the latch pulses LP1–LPD rise in synchronism with the rise of the delayed clock signals CLK1–CLKD that are output from the delay elements D1–DD after the rise time point tb of the trigger pulse TGP. Accordingly, in a similar manner to the delayed clock signals, the latch pulses LP8–LPD rise almost at the same timing as the latch pulses LP0–LP5.

Thus, as the trigger pulse TGP is output from the zero cross circuit 18 at time point tb, the flip-flop circuits 24 and 2C are caused to simultaneously output the latch pulses LP4 and LPC in response to the delayed clock signals CLK4 and CLK that rise first after the rise time point tb of the trigger pulse TGP. Subsequently, the flip-flop circuits 25 and 2D simultaneously output the latch pulses LP5 and LPD in synchronism with the rise of the delayed clock signals CLK5 and CLKD. Thereafter, in a similar fashion, the flip-flop circuits 26, 27, 20 and 28, 21 and 29, 22 and 2A, 23 and 2B sequentially output the latch pulses LP6, LP7, LP0 and LP8, LP1 and LP9, LP2 and LPA, LP3 and LPB in synchronism with the rise of the delayed clock signals CLK6, CLK7, CLK0 and CLK8, CLK1 and CLK9, CLK2 and CLKA, CLK3 and CLKB.

The synchronous counter 13 counts up or increments its count Ny in synchronism with the fall of the reference clock signal CLK0. In the example of FIG. 2, the synchronous counter 13 is shown as incrementing from "Qn−1" past "Qn" up to "Qn+1". During the count-up, at time point tc, the flip-flop circuit 20 output the latch pulse LP0 to the latch circuit 19 and the pattern latch circuit 30. Thereupon, the latch circuit 19 latches "Qn" as a count value Ny for time point tc. At the same time, the pattern latch circuit 30 holds the individual latch pulses LP1–LPD of the flip-flop circuits 21–2D being generated at time point tc, and then outputs the thus-latched pulses as pattern data Y1–YD to the divisor/dividend detecting circuit 40.

Among the pattern data Y1–YD, those data having low level "0" represent the delayed clock signals CLK1–CLK3 and CLK8–CLKB that already have risen prior to the output time point tb of the trigger pulse TGP within one period ta–tc of the reference clock signal CLK0, and hence represent the latch pulses LP1–LP3 and LP8–LPB that have risen following the rise time point tc of the latch pulse LP0.

Conversely, among the pattern data Y1–YD, those data having high level "1" represent the delayed clock signals CLK4–CLK7 and CLKC–CLKD that have risen following the output time point tb of the trigger pulse TGP within one period ta–tc of the reference clock signal CLK0, and hence represent the latch pulses LP4–LP7 and LPC and LPD that already have risen prior to the rise time point tc of the latch pulse LP0.

As mentioned earlier, the divisor/dividend detecting circuit 40 regards the pattern data Y1–YD as a train of serial data, and determines as a divisor DX the number of the pattern data outputted during such a time when level of the serial data changes from high level "1" to low level "0", and determines as a divisor DX the number of the low level "0" pattern data outputted during such a time when level of the serial data changes from high level "1" to low level "0 and also appearing before the high level "1".

If viewed as a train of serial data, the pattern data Y1–YD of FIG. 2 read "0001111000011". More specifically, the pattern data Y4, Y5, Y6, Y7, YC and YD are of high level "1", and the remaining pattern data Y1, Y2, Y3, Y8, Y9, YA and YB are of low level "0". The number of the pattern data outputted during the time when the pattern data level changes from high level "1" to low level "0" is eight (i.e., pattern data Y1–Y8), while the number of the low level "0" pattern data outputted during the time when the pattern data level changes from high level "1" to low level "0 and also appearing before the high level "1" pattern data Y4, Y5, Y6 and Y7 is three (i.e., pattern data Y1–Y3). Consequently, the divisor/dividend detecting circuit 40 provides the divider 50 with "8" and "3" as divisor DX and dividend DY, respectively.

Then, the divider 50 divides the dividend DY of "8" by the divisor DX of "3" and outputs the division result as three-bit quotient data Nz of "011". This quotient data Nz is added with output data "Q" of the latch circuit 19 and thus "Q+3/8" is obtained. As the result, this sensor unit outputs, as ultimate position data, "Q+3/8".

So far, an example has been described in which each of the delay elements D1–DD effects a 3 ns delay time, but, as mentioned earlier, the inverter element making up the delay elements D1–DD is so sensitive to various fluctuations in environment such as temperature and supply voltage as to cause delay time fluctuation within an approximate range of ±50. Due to this, it may happen that delay time of each of the delay elements D1–DD fluctuates within a range of 1.5 ns to 4.5 ns.

In this connection, description will now be made with reference to FIGS. 3 and 4, as to how the sensor unit shown in FIG. 1 operates in the event where the respective delay times of the delay elements D1–DD has been caused to fluctuate.

Figure 3:
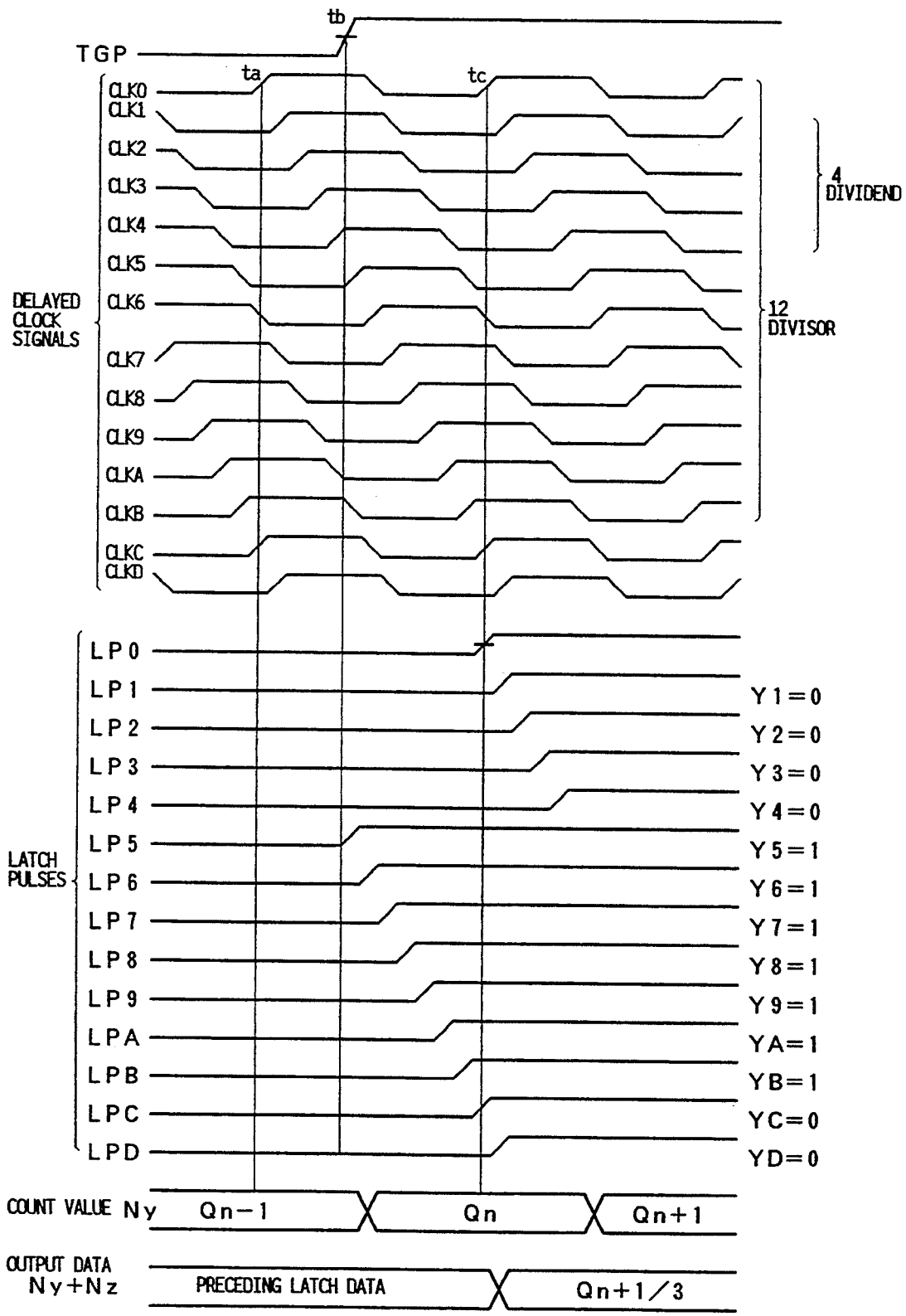
FIG. 3 is a second timing chart explanatory of how the position sensor unit shown in FIG. 1 operates when the delay time achieved by the delay elements is about 2 ns.
Figure 4:
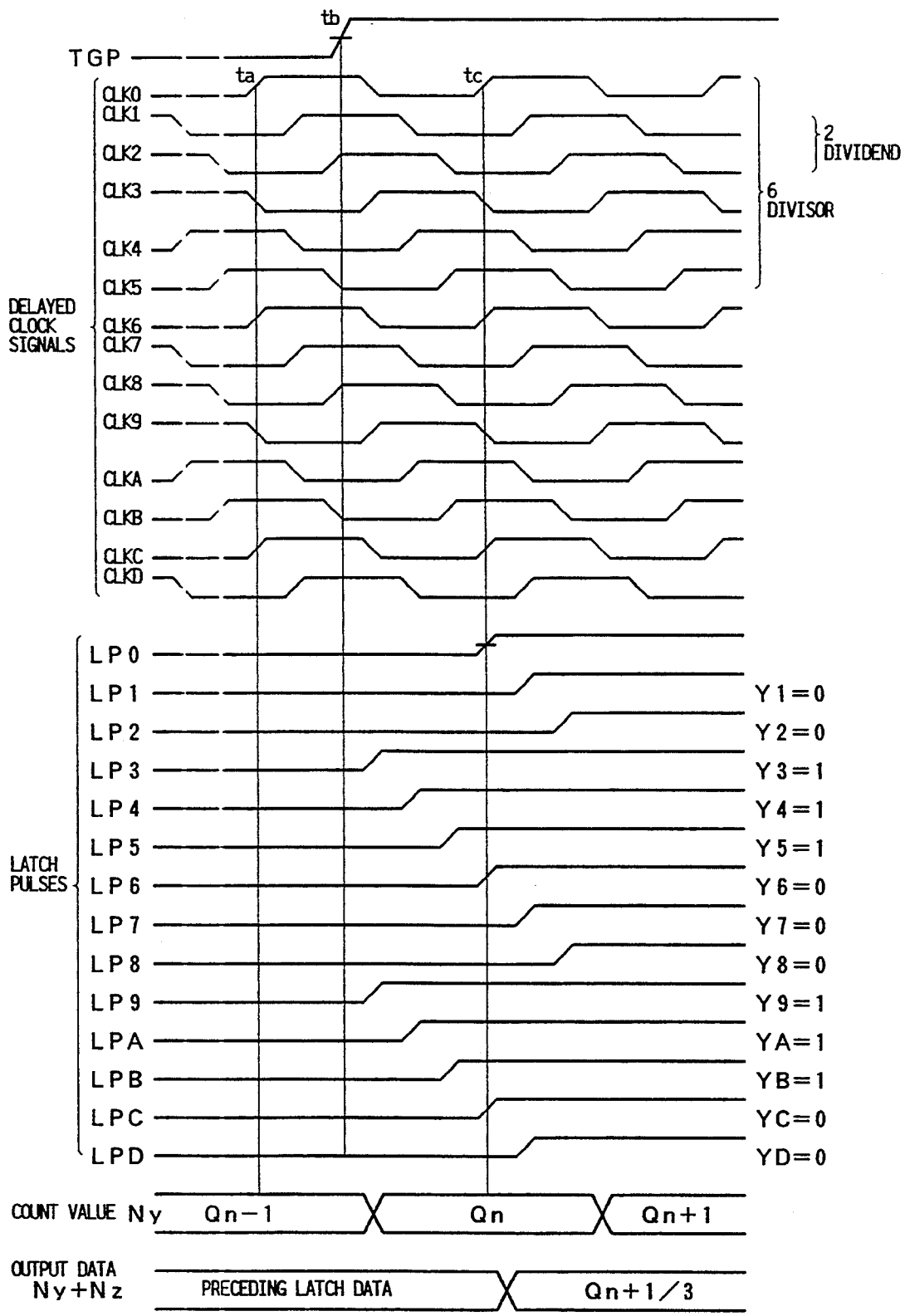
FIG. 4 is a third timing chart explanatory of how the position sensor unit shown in FIG. 1 operates when the delay time achieved by the delay elements is about 4 ns.

FIG. 3 shows an example where delay time of each of the delay elements D1–DD has been reduced to about 2 ns, while FIG. 4 shows another example where delay time of each of the delay elements D1–DD has been increase to about 4 ns. In both FIG. 3 and FIG. 4, the relationship between rise and fall time points ta, tc of reference clock signal CLK0 and rise time point tb of trigger pulse TGP is completely identical to that shown in FIG. 2.

As described above, in the example of FIG. 2 where the delay elements D1–DD each effect a 3 ns delay time, the delayed clock signal CLK8 is substantially coincident in timing with the reference clock signal CLK0. But, in the example of FIG. 3 where the delay elements D1–DD each effect a 2 ns delay time, timing of the delayed clock signal CLKC substantially coincides with that of the reference clock signal CLK0, and further in the example of FIG. 4 where the delay elements D1–DD each effect a 4 ns delay time, timing of the delayed clock signal CLK6 substantially coincides with that of the reference clock signal CLK0.

Consequently, as the trigger pulse TGP generated from the zero cross circuit 18 rises at time point tb, the flip-flop circuits 20–2D outputs latch pulses LP0–LPD as shown in FIG. 3 or FIG. 4. The latch pulses LP1–LPD output from the flip-flop circuits 21–2D are synchronous with the rise of the delayed clock signals CLH1–CLKD occurring after output time point tb of the trigger pulse TGP, and so the number of the delayed clock signals that already have risen prior to output time point tb of the trigger pulse TGP is four in the example of FIG. 3 (i.e., CLK1–CLK 4) and is two in the example of FIG. 4 (i.e., CLK1 and CLK2). Similarly, the number of the latch pulses that have risen after rise time point tc of the latch pulse LP0 is four in the example of FIG. 3 (i.e., LP1–LP4) and is two in the example of FIG. 4 (i.e., LP1 and LP2).

Further, because the synchronous counter 13 increments its count value Ny from "Qn−1" past "Qn" up to "Qn+1" in synchronism with the fall of the reference clock signal irrespective of the delay time of the delay elements D1–DD, the latch circuit 19 latches "Qn" as count value Ny for rise time point tc of the latch pulse LP0. Simultaneously, the pattern latch circuit 30 latches the latch pulses LP1–LPD occurring at time point tc, so as to output the pattern data Y1–YD.

In the example of FIG. 3, the pattern data Y1–Y4, YC and YD are of low level "0", while the pattern data Y5–YB are of high level "1"; that is, within one period ta–tc of the reference clock signal CLK0, the delayed clock signals CLK1–CLK4, CLKC and CLKD have already risen prior to output time point tb of the trigger pulse TGP, and the latch pulses LP1–LP4, LPC and LPD have risen after rise time point tc of the latch pulse LP0. Further, the delayed clock signals CLK5–CLKB have risen after output time point tb of the trigger pulse TGP, and the latch pulses LP5–LPB have already risen prior to rise time point tc of the latch pulse LP0.

On the other hand, in the illustrated example of FIG. 4, the pattern data Y1, Y2, Y6–Y8, YC and YD are of low level "0", while the pattern data Y3–Y5 and Y9–YB are of high level "1"; that is, within one period ta–tc of the reference clock signal CLK0, the delayed clock signals CLK1, CLK2, CLK6–CLK8, CLKC and CLKD have already risen prior to output time point tb of the trigger pulse TGP, and the latch pulses LP1, LP2, LP6–LP8, LPC and LPD have risen after rise time point tc of the latch pulse LP0. Further, the delayed clock signals CLK3–CLK5 and CLK9–CLKB have risen after output time point tb of the trigger pulse TGP, and the latch pulses LP3–LP5 and LP9–LPB have already risen prior to rise time point tc of the latch pulse LP0.

The divisor/dividend detecting circuit 40 regards the pattern output data Y1–YD as a train of serial data, and determines as a divisor DX the number of the pattern data outputted during such a time when level of the serial data changes from high level "1" to low level "0", and it determines as a divisor DX the number of the low level "0" pattern data output during the time when level of the serial data changes from high level "1" to low level "0 and yet appearing before the high level "1" data.

If viewed as a train of serial data, the pattern data Y1–YD of FIG. 3 read "0000111111100". The number of the pattern data outputted during such a time when level of the serial data changes from high level "1" to low level "0" is twelve (i.e., pattern data Y1–YC), while the number of the low level "0" pattern data outputted during the time when level of the serial data changes from high level "1" to low level and yet appearing before the high level "1" pattern data Y5–YB is four (i.e., pattern data Y1–Y4). Consequently, in the example of FIG. 3, the divisor/dividend detecting circuit 40 provides the divider 50 with "12" and "4" as divisor DX and dividend DY, respectively.

Similarly, if viewed as a train of serial data, the pattern data Y1–YD of FIG. 4 read "0011100011100". The number of the pattern data outputted during such a time when level of the serial data changes from high level "1" to low level "0" is six (i.e., pattern data Y1–Y6), while the number of the low level "0" pattern data outputted during the time when level of the serial data changes from high level "1" to low level "0" and yet appearing before the high level "1" pattern data Y3–Y5 is two (i.e., pattern data Y1 and Y2). Consequently, in the example of FIG. 4, the divisor/dividend detecting circuit 40 provides the divider 50 with "6" and "2" as divisor DX and dividend DY, respectively.

Then, in the example of FIG. 3, the divider 50 divides the dividend DY of "4" by the divisor DX of "12" and outputs, as quotient data Nz, upper three-bit "011" of the division result (4/12=1/3). Similarly, in the example of FIG. 4, the divider 50 divides the dividend DY of "2" by the divisor DX of "6" and outputs, as quotient data Nz, upper three-bit "011" of the division result (2/6=1/3).

In this manner, in each of the arrangements of FIGS. 2, 3 and 4, the position sensor unit ultimately outputs, as position data, a sum of the output "Q" and the digital data Nz "011".

As will be readily understood from the foregoing, according to this embodiment, value of the digital data Nz ultimately outputted from the divider 50 remains at substantially the same value, even when the delay times of the delay elements D1–DD are caused to fluctuate over a range of ±50%. So, it is made possible to accurately measure a time point when trigger pulse TGP is generated within one period of the reference clock signal CLK.

FIG. 5 is a block diagram illustrating in detail the structure of the divisor/dividend detecting circuit 40, and FIG. 6 is a timing chart explanatory of its operation and illustrating how the detecting circuit 40 operates when a group of latch pulses LPO–LPD is inputted thereto.

First, the structure of the divisor/dividend detecting circuit 40 will be described with reference to FIG. 5.

A shift register 41 receives in parallel pattern data Y1–YN from the pattern latch circuit 30 of FIG. 1, shifts the received pattern data Y1–YN in synchronism with the rising edge of shift pulse SHP, and delivers, as shift register output data Yi, the pattern data Y1–YN to a flip-flop circuit 43, AND circuit 44 and inverter circuit 51. Namely, the shift register 41 converts parallel pattern data Y1–YN provided from the pattern latch circuit 30 into serial data Yi and sequentially outputs the serial data Yi in response to the shift pulse SHP.

A detecting counter 42 inputs start pulse STP at its clear terminal CLR and shift pulse SHP at its clock terminal C in such a manner that it resets its count value in response to the start pulse STP and then counts up in response to the shift pulse SHP. The detecting counter 42 outputs its detection count value Nd to data input terminals D of a dividend latch circuit 58 and a divisor latch circuit 59.

The flip-flop circuit 43 inputs at its D terminal the shift register output data Yi provided from the shift register 41, and it also inputs the shift pulse SHP at its clock terminal C and the start pulse STP at its clear terminal CL. The flip-flop circuit 43 is reset in response to the inputted shift pulse SHP, and thereafter operates to give an AND circuit 52 shift signal Yi−1 that is obtained by shifting, by one shift pulse SHP, the shift register output Yi provided from the shift register 41 and also gives the AND circuit 44 inverted output signal *Yi−1 (hereinafter, * denotes inverted output signal) obtained by inverting the shift signal Yi−1.

The AND circuit 44, inverter circuit 45, flip-flop circuit 46, AND circuit 47, inverter circuit 48 and AND circuit 49 cooperate to generate dividend latch pulse LTR that is used by the dividend latch circuit 58 for latching the detection count value Nd outputted from the detecting counter 42.

The AND circuit 44 obtain an AND between the shift register output data Yi of the shift register 41 and the inverted output signal *Yi−1 of the flip-flop circuit 43, and it provide the AND to the inverter circuit 45 and the AND circuit 47.

The inverter circuit 45 inverts the AND signal of the AND circuit 44 and outputs the inverted AND signal to clock terminal C of the flip-flop circuit 46.

The flip-flop circuit 46 inputs the start pulse at its clear terminal CLR so that it is reset in response to the inputted start pulse STP. Because high level "1" is input to its D terminal and the inverted output of the inverter circuit 45 is inputted to clock terminal C, the flip-flop circuit 46, upon detection of the rising edge of the inverted output of the inverter circuit 45, continues to output low level "0" as inverted output *Q to the AND circuit 47 until it is again reset by start pulse STP. Namely, the flip-flop circuit 46 detects a time point when the serial pattern data Y1–YD changes from low level "0" to high level "1".

The AND circuit 47 obtains an AND between the AND signal of the AND circuit 44 and the inverted output *Q of the flip-flop circuit 46 and provides the obtained AND as rise-detection signal YR to the AND circuit 49. The inverter circuit 48 inverts the shift pulse SHP and provides the inverted shift pulse *SHP to the AND circuits 49 and 57. The AND circuit 49 obtains AND between the inverted shift pulse *SHP from the inverter circuit 48 and the rise-detection signal YR from the AND circuit 47, and it provides the obtained AND as dividend latch pulse LTR to clock terminal C of the dividend latch circuit 58.

Further, inverter circuit 51, AND circuit 52, inverter circuit 53, flip-flop circuit 54, AND circuit 55, flip-flop circuit 56 and AND circuit 57 cooperate to generate divisor latch pulse LTF that is used by the dividend latch circuit 58 for latching the detection count value Nd of the detection counter 42.

More specifically, the inverter circuit 51 inverts the shift register output data Yi of the shift register 41 and provides the inverted data as inverted shift register output data *Yi to the AND circuit 52.

The AND circuit 52 obtains an AND between the inverted shift register output data *Yi from the inverter circuit 52 and the shifted signal Yi−1 and provides the obtained AND to the AND circuit 55.

The flip-flop circuit 54 inputs the start pulse at its clear terminal CLR so that it is reset in response to the inputted start pulse STP. Because high level "1" is input to its D terminal and the inverted output of the inverter circuit 53 is inputted to its clock terminal C, the flip-flop circuit 54, upon detection of the rising edge of the inverted output of the inverter circuit 53, continues to output low level "0" as inverted output *Q to the AND circuit 55 until it is again reset by start pulse STP. Namely, the flip-flop circuit 54 detects a time point when the serial pattern data Y1–YD changes from high level "1" to low level "0".

The AND circuit 55 obtains an AND between the AND signal of the AND circuit 52 and the inverted output *Q of the flip-flop circuit 54 and provides the obtained AND as fall-detection signal YFO to D terminal of the flip-flop circuit 56.

The fall-detection signal YFO provided from the AND circuit 55 is inputted to the D terminal of the flip-flop circuit 56, the shift pulse SHP to the clock terminal C and the start pulse STP to the clear terminal CLR, so that the flip-flop circuit 56 is reset by the start pulse STP and thereafter operates to shift, by an amount corresponding to one shift pulse, the fall-detection signal YFO and provides the shifted signal as shifted fall-detection signal YF1 to the AND circuit 57. The AND circuit 57 obtains AND between the inverted shift pulse *SHP from the inverter circuit 48 and the shifted fall-detection signal YF1 from the flip-flop circuit 56, and it provides the obtained AND as divisor latch pulse LTF to clock terminal C of the divisor latch circuit 59.

The divisor latch circuit 58 latches initial value Dr2 of the dividend in response to the input of the start pulse STP to its initial value setting terminal LD. For example, in the embodiment shown in FIG. 1, "7" is latched as initial value Dr2 because basic value of the divisor is "8".

Further, the dividend latch circuit 58 inputs at its data input terminal D detection count value Nd that is provided after another from the detection counter 42 in response to the shift pulse SHP and also inputs at its clock terminal C dividend latch pulse LTR provided from the AND circuit 49, so that it latches the detection count value Nd in synchronism with the rising edge of the dividend latch pulse LTR and provides the latched value as dividend signal DY to the divider 50.

In a similar manner to the dividend latch circuit 58, the divisor latch circuit 59 latches initial value Dr1 of the divisor in response to the input of the start pulse STP to its initial value setting terminal LD. For example, in the embodiment shown in FIG. 1, "8" is latched as a basic value of the divisor.

Further, the dividend latch circuit 59 inputs at its data input terminal D detection count value Nd that is provided one after another from the detection counter 42 in response to the shift pulse SHP and also inputs at its clock terminal C divisor latch pulse LTF provided from the AND circuit 57, so that it latches the detection count value Nd in synchronism with the rising edge of the divisor latch pulse LTF and provides the latched value as divisor signal DX to the divider 50.

Next, the operation of the divisor/dividend detecting circuit 40 will be described with reference to the timing chart shown in FIG. 6.

First, in response to the falling edge of start pulse STP, pattern data Y1-YD of FIG. 2 are received in parallel by the shift register 41, and the detection counter 42, flip-flop circuits 43, 46, 54, 56 are reset. Also, "7" is set, as initial value Dr2 of dividend DY, to the dividend latch circuit 58, while "8" is set, as initial value Dr1 of divisor DX to the divisor latch circuit 59.

The shift register 41 sequentially outputs the pattern data Y1-YD in response to the rising edge of the shift pulse SHP, and the detection counter 42 outputs detection count value Nd passed through the count-up process in response to the rising edge of the shift pulse. The shift register 41 outputs shift register output data Yi as shown in FIG. 6 to the flip-flop circuit 43, AND circuit 44 and inverter circuit 51. In the illustrated example of FIG. 6, pattern data Y1-Y3 and Y8-YB are of low level "0" and pattern data Y4-Y7 and YC-YD are of high level "1".

The flip-flop circuit 43 operates to give the AND circuit 52 shift signal Yi−1 that is obtained by shifting, by an amount corresponding to one shift pulse SHP, the shift register output signal Yi provided from the shift register 41 and also gives the AND circuit inverted output signal *Yi−1. The AND circuit 44 obtain and AND between the shift register output data Yi and the inverted output signal *Yi−1 and provides the AND to the inverter circuit 45 and the AND circuit 47. Thus, the AND circuit 44 outputs and AND signal of high level "1" at time points corresponding to pattern data Y4 and TC of the shift register outputs among the shift register output signal Yi.

On the other hand, by the action of the flip-flop circuit 46, the AND signal 47 outputs, as rise-detection signal YR to the AND circuit 49, an AND signal of high level "1" at a time point corresponding to pattern data Y4, i.e., the very first one of AND signals of high level "1" provided from the AND circuit 44.

The AND circuit 49 obtains AND between the invert of the shift pulse SHP from the inverter circuit 48 and the rise-detection signal YR from the AND circuit 47, and it provides the obtained AND as dividend latch pulse LTR to clock terminal C of the dividend latch circuit 58. The dividend latch pulse LTR provided from the AND circuit 49 rises exactly when the detection count value Nd has been stabilized.

Thus, in response to the input thereto of the dividend latch pulse LTR, the dividend latch circuit 58 latches "3" as the detection count value Nd for the rise time point of the dividend latch pulse LTR and then provides the latched value as dividend signal DY to the divider 50. The AND circuit 52 provides the inverter circuit 53 and AND circuit 55 with an AND between the inverted shift register output data *Yi from the inverter circuit 52 and the shifted signal Yi−1. Thus, the AND circuit 52 outputs and AND signal of high level "1" at a time point corresponding to pattern data Y8 of the shift register output signal Yi.

By the action of the flip-flop circuit 54, the AND signal 55 outputs, as fall-detection signal YFO to the AND circuit 56, an AND signal of high level "1" at a time point corresponding to pattern data Y8, i.e., the very first one of AND signals of high level "1" provided from the AND circuit 52. By the way, as for the pattern data shown in FIG. 2, the flip-flop circuit 54 need not operate because the AND circuit 52 outputs AND signal of high level "1" only once. But, as for the pattern data shown in FIG. 4, the AND circuit 52 outputs AND signal of high level "1" twice, and so, by the action of the flip-flop circuit 54, the AND signal 55 outputs, as fall-detection signal YF0 to the AND circuit 56, the very first one of AND signals of high level "1" provided from the AND circuit 52.

The fall-detection signal YF0 is provided to the AND circuit 57 as shifted fall-detection signal YF1 that has been delayed by the flip-flop circuit 56 by an amount corresponding to one shift pulse.

The AND circuit 57 provides clock terminal C of the divisor detecting circuit 59 with the AND between the invert of the shift pulse SHP and the fall-detection signal YF1 as a divisor latch pulse LTF. The divisor latch pulse LTF provided from the AND circuit 57 rises exactly when the detection count value Nd has been stabilized.

Thus, in response to the input thereto of the divisor latch pulse LTF, the divisor latch circuit 59 latches "8" as the detection count value Nd for the rise time point of the divisor latch pulse LTF and then provides the latched value as a divisor signal Dx to the divider 50.

With the above-described divisor/dividend detecting circuit 40, there is achieved the superior advantage that it is made possible to accurately measure a time point when trigger pulse TGP is outputted, even when delay time of the delay elements D1-DD fluctuate through a range of ±50% or so.

It should now be appreciated that with the position sensor unit of FIG. 1, it is made possible to highly improve the detection accuracy (resolution) of position data outputted with a predetermined period (primary carrier frequency fc). However, the enhanced detection accuracy of position data outputted with a predetermined period may very often result in undesirable slip-out of position data.

Figure 13:
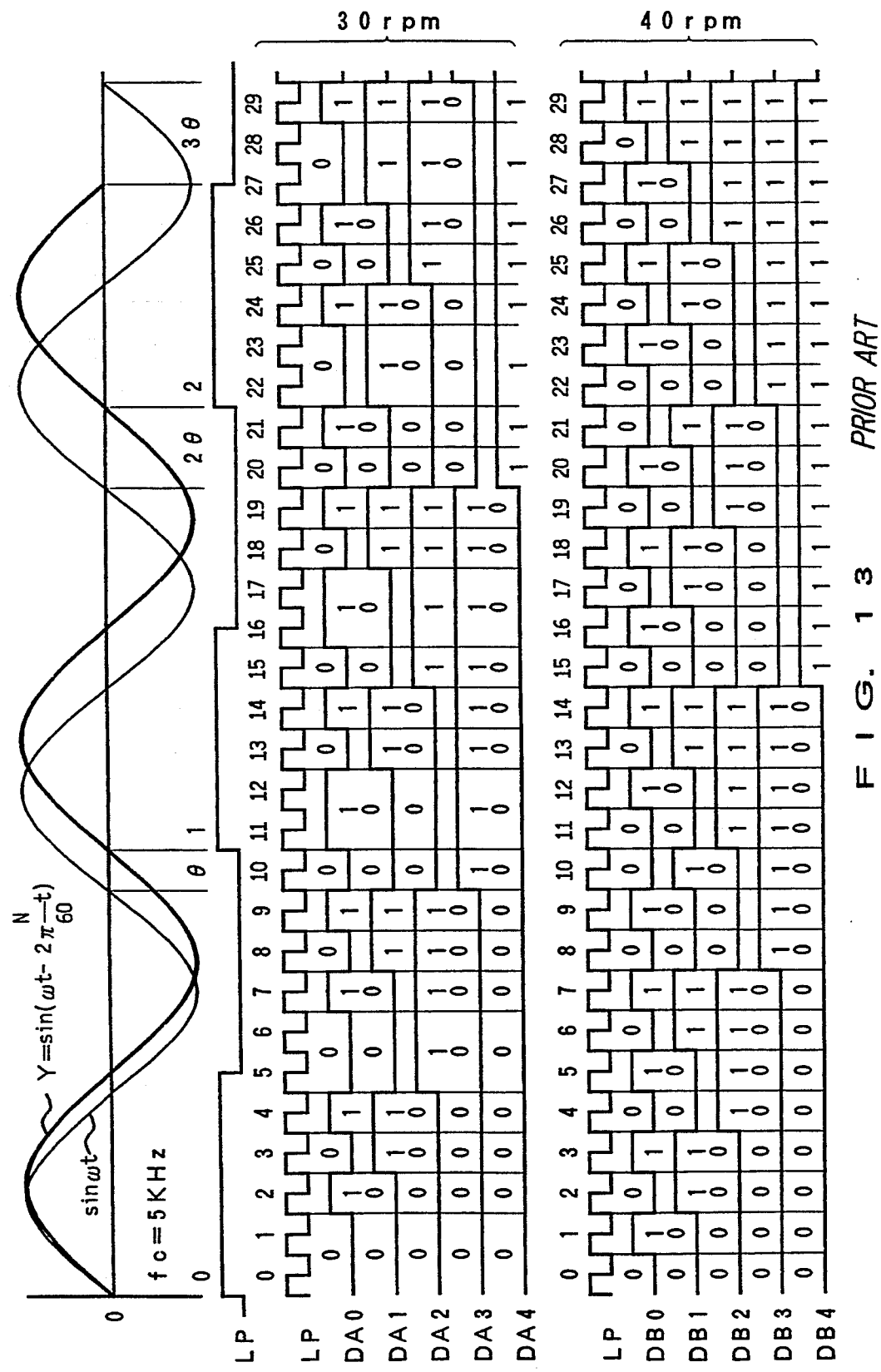
FIG. 13 is a timing chart explanatory of how the position sensor unit of FIG. 11 operates.

Such a slip-out of position data have also been encountered in the prior art position sensor unit shown in FIG. 11. Referring to FIG. 13, position data DB4-DB0 are lower five bits of position data Ny outputted from the latch circuit 19 of the sensor unit of FIG. 11 when the primary carrier frequency fc is 5 KHz and rotation speed of the motor is 40 rpm. In this condition, value of rotational position data corresponding to one count of the synchronous counter 13 of the position sensor unit is $2\pi/8{,}192=\pi/4{,}096$, but value of rotational position data indicative of rotational movement effected within one period, 0.2 ms of the primary carrier frequency fc is $2\pi \times 40 \div (60 \times 5{,}000)=\pi/3{,}750$. This means that at the rotation speed of 40 rpm, the rotational position data indicative of rotational movement effected within one period of 0.2 ms is greater in value than the rotational position data corresponding to one count of the synchronous counter 13.

Thus, in an opposite manner to the above-mentioned case where the rotation speed is 30 rpm, the output position data will change at each output timing of latch pulse LP. Consequently, "01010" is outputted as position data DB4–DB0 at the output timing of 10th latch pulse LP, and then "01100" is outputted as position data DB4–DB0 at the output timing of 11th latch pulse LP. However, although "01011" must be outputted as position data DB4–DB0 between the output timings of the 10th and 11th latch pulses LP, the data "01011" has actually been slipped out. This slip-out is due to the above-mentioned fact that the rotational position data indicative of rotational movement effected within one period of 0.2 ms is greater in value than the rotational position data corresponding to one count of the synchronous counter 13. In a similar manner, between the 21st and 22nd latch pulses, position data "10111" has been slipped out.

In accordance with the increase in the rotation speed, such a slip-out of position data occurs more frequently and the number of slipped out data increases. Further, if the oscillation frequency of the clock oscillator 12 is 40.96 MHz and the primary carrier frequency is 5 KHz, the rotation speed Nr at which such a slip-out of position data occurs is $2\pi/8{,}192 = 2\pi \times Nr \div (60 \times 5{,}000)$ and therefore $Nr = 60 \times 5{,}000 \div 8{,}192 \approx 36.6$ rpm, since it occurs at such a time when the rotational position data indicative of rotational movement effected within 0.2 ms is equal in value to the rotational position data corresponding to one count of the synchronous counter 13. Similarly, if the oscillation frequency of the clock oscillator 12 is 40.96 MHz and the primary carrier frequency is 10 KHz, the rotation speed Nr at which a slip-out of position data occurs is $2\pi/4{,}096 = 2\pi \times Nr \div (60 \times 10{,}000)$ and therefore $Nr = 60 \times 10{,}000 \div 4{,}096 \approx 146.5$ rpm, since it occurs at such a time when the rotational position data indicative of rotational movement effected within 0.1 ms is equal in value to the rotational position data corresponding to one count of the synchronous counter 13.

The above-mentioned slip-out of position data is encountered in the prior art position sensor unit; however, it is particularly noticeable in the case where the position sensor unit of the present invention is employed. It is due to the fact the position sensor unit of the present invention can increase the data accuracy or resolution two to thirty two times as high as that achieved by the prior art sensor unit. Therefore, as long as position data can be accurately output without any slip-out, a part of the position is suitably used as incremental pulse.

Hereinafter, description will be made as to the structure of a position data generating unit which is capable of accurately outputting position data without any data slip-out, in conjunction with FIG. 7.

As shown, the position data generating unit generally comprises a current value data latching circuit 70, preceding value data latching circuit 71, pulse interval converting circuit 73, pulse number storing circuit 74, timing generating circuit 75, pulse generating circuit 76 and position data generating circuit 77. In response to each latch pulse LPOi that is inputted from the flip-flop circuit 20 of FIG. 1, the timing generating circuit 75 outputs a predetermined timing signal to various circuits of the position data generating unit.

In response to the latch pulse provided from the timing generating circuit 75, the current value data latching circuit 70 operates to latch position data Ny+Nz outputted from the latch circuit 19 and divider 50 of FIG. 1, and delivers the latched position data as current value data Nnew to the difference calculating circuit 72. At the same time, the current value data latching circuit 70 provides the preceding value data latching circuit 71 with preceding value data Nold corresponding to position data Ny−1+Nz−1 which it has been latching until the input time of the latch pulse Li. The preceding value data Nold is in other words position data outputted from the latch circuit 19 and divider 50 one cycle before the latch pulse LPOi. The preceding value data latching circuit 71 latches, as preceding value data Nold, the position data Ny+Nz latched by the current value data latching circuit 70, and then outputs the latched data Nold to the difference calculating circuit 72 and the position data generating circuit 77.

The difference calculating circuit 72, in response to a subtraction instructing pulse DP given from the timing generating circuit 75, operates to subtract the preceding value data Nold of the preceding value data latching circuit 71 from the current value data Nnew of the current value data latching circuit 70, and outputs the resultant difference value data DV to the pulse interval converting circuit 73 and pulse number storing circuit 74.

Upon receipt of the difference value data DV and in response to a conversion instructing pulse CP, the pulse interval converting circuit 73 operates to convert the difference value data DV into pulse interval data PW and outputs the converted data to the pulse generating circuit 76. This pulse interval data PW designates pulse interval that is necessary for outputting a specific number of pulses at an equal interval within a output period Tp of the latch pulse LPOi.

The pulse number storing circuit 74 is a circuit which, in response to a storage instructing pulse RP provided from the timing generating circuit 75, operates to store the difference value data DV received from the difference calculating circuit 72 (i.e., the number of pulses to be outputted within one period of the primary carrier frequency fc).

The pulse generating circuit 76 is composed of a ring counter which counts clock pulses CLK sequentially outputted from the timing generating circuit 75 and outputs a pulse train Pi to the position data generating circuit 76 each time one cycle of counting has been completed. Also, the cyclic count value of this pulse generating circuit 76 can be changed by computer program in accordance with the pulse interval data PW given from the pulse interval converting circuit 73.

Accordingly, as the pulse interval data PW becomes greater, the count value of the pulse generating circuit 76 becomes greater, and so output interval of the pulse train Pi also becomes greater and the number of the pulses Pi outputted within one period of the latch pulse LPOi becomes smaller. Conversely, as the pulse interval data PW becomes smaller, the count value of the pulse generating circuit 76 becomes smaller, and so the output interval of the pulse train Pi also becomes smaller and the number of the pulses Pi outputted within one period of the latch pulse LPOi becomes greater.

The position data generating circuit 77 is also composed of a ring counter which counts pulses Pi outputted from the pulse generating circuit 76 and has its cyclic count capacity established at the same value as the synchronous counter 13. The position data generating circuit 77 is set in advance at the preceding value data Nold of the preceding value data latching circuit 71 as its initial count value, so that the circuit 77, in response to an output start instructing pulse SP, operates to count a specific number of pulses Pi given from the pulse generating circuit 76, which specific number corresponds to the difference value data DV stored in the pulse number storing circuit 74. That is, in response to the input timing of the pulses Pi, the position data generating circuit 77 sequentially outputs position data NO which has been slipped out between the preceding value data Nold and the current value data Nnew.

Now, description will be made on the operation of the above-mentioned position data generator of FIG. 7, with reference to FIG. 8.

Figure 8:
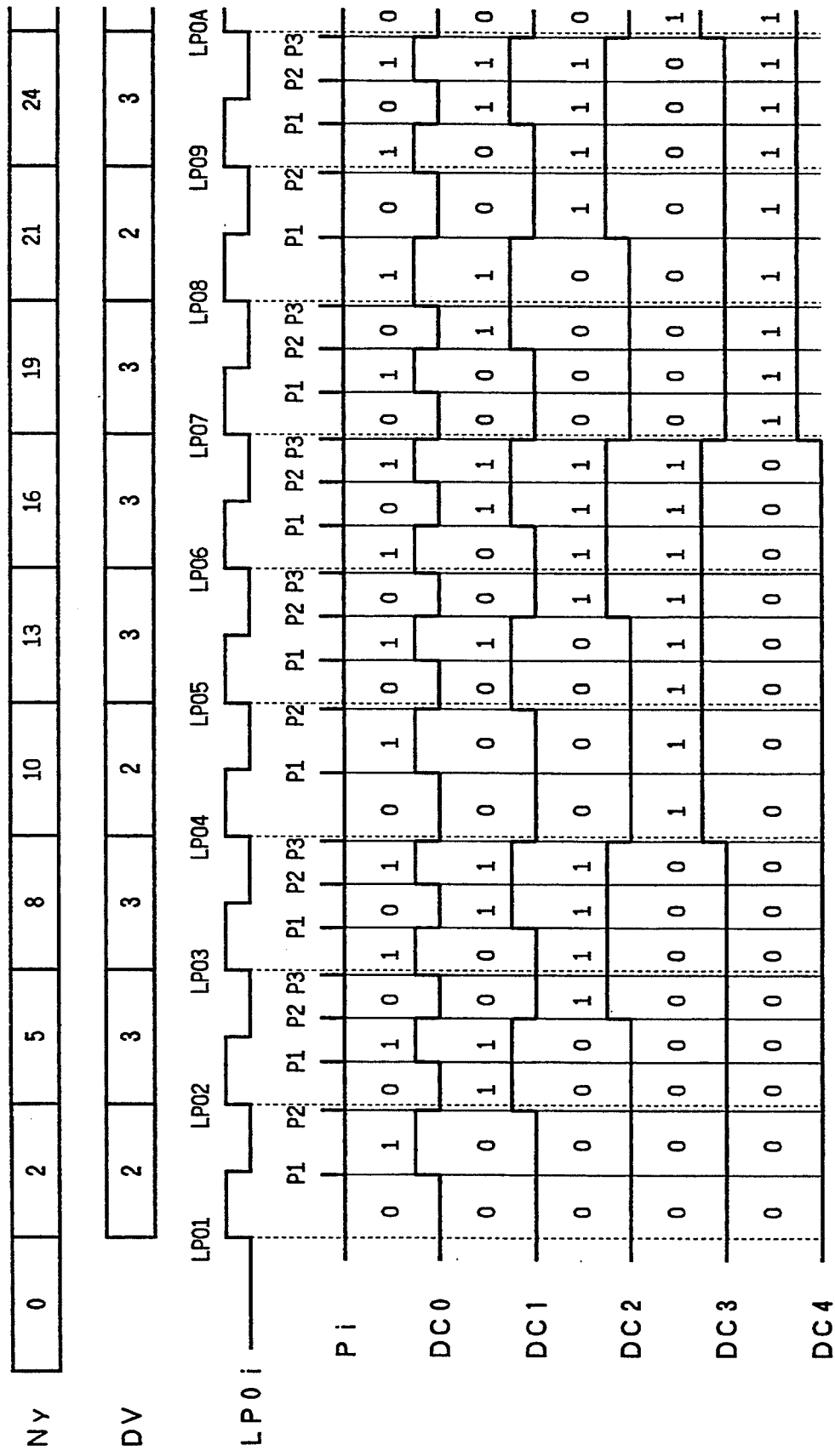
FIG. 8 is a first timing chart explanatory of how the position data generator shown in FIG. 7 operates.

In FIG. 8, position data DC4–DC0 represent the lower five bits of position data outputted from the position data generating circuit 77 in the case where the primary carrier frequency fc is 5 KHz and the rotation speed of the motor is 12.5 rpm. In this condition, value of rotational position data indicative of a rotational movement effected within one period, i.e., 0.2 ms of the primary carrier frequency fc is $2\pi \times 12.5 \div (60 \times 5,000) = \pi/12,000$ radian, while value of rotational position data corresponding to the lowest bit of position data outputted from the divider 50 of the position sensor unit of FIG. 1 is $2\pi/65,536 (=\pi/32,768)$ radian.

Therefore, within one period, i.e., 0.2 ms of the primary carrier frequency fc, the position sensor unit of FIG. 1 increases the value of position data Ny+Nz by two or three. For example, the value of position data Ny+Nz which is "0" at the time of the 0th latch pulse LP00 becomes "2" at the time of the first latch pulse LP01. Thereafter, "5", "8", "10", "13", "16", "19", "21", "24" ... will be sequentially outputted from the latch circuit 19 and divider 50 in accordance with the order of latch pulses LP02, LP03, LP04, LP05 ....

When latch pulse LP01 is outputted from the flip-flop circuit 20 of FIG. 1 to the latch circuit 19 and timing generating circuit 75, the latch circuit 19 and divider 50 output "2" as position data Ny+Nz, and the timing generating circuit 75 provides latch pulse L1 to the current value data latching circuit 70 and preceding value data latching circuit 71. Consequently, "2" is latched as current value data Nnew into the current value data latching circuit 70 and, "0" is latched as preceding value data Nold into the preceding value data latching circuit 71.

The timing generating circuit 75, after having providing the latch pulse L1 to the current value data latching circuit 70 and preceding value data latching circuit 71, provides the subtraction instructing pulse DP to the difference calculating circuit 72. The difference calculating circuit 72 then calculates difference value "2" between the current value data Nnew and the preceding value data Nold and outputs the calculated value as difference value data DV to the pulse interval converting circuit 73 and pulse number storing circuit 74.

Having received the difference value data DV from the calculating circuit 72, the pulse interval converting circuit 73 converts the difference value data DV into pulse interval data PW which is then provided to the pulse generating circuit 76. Namely, since the difference value is "2" in this case, it is only sufficient for outputting two pulses Pi within one period Tc (=200 μs) of the primary carrier frequency fc (=5 KHz) that pulses Pi be outputted at an interval of 100 μs which is obtained by dividing the one period Tc by the difference value DV ("2"). Therefore, the pulse interval converting circuit 73 outputs to the pulse generating circuit 76 pulse interval data PW that corresponds to Tc/DV.

The pulse generating circuit 76 then outputs a pulse train Pi at each time corresponding to the pulse interval data PW. In this case, the pulse generating circuit 76 outputs pulse trains P1 and P2 every 100 μs.

Because of "0" stored in advance as the preceding value data Nold latched in the preceding value data latching circuit 71, the position data generating circuit 77 performs an incremental process on position data in response to the input of the pulse train Pi. Namely, at the time of the first latch pulse LP01, the position data generating circuit 77 outputs as position data DA4–DA0 "00000", "00001" and "00010".

Within the period of this first latch pulse LP01, it is sufficient for the pulse generating circuit 76 to two pulse trains P1 and P2, but it may happen that third incremental pulse train is generated. Even in such a case, there arises no problem because the position data generating circuit 77 operates as if no excessive pulse train Pi exceeding the value designated by the difference value data DV were not inputted from the pulse number storing circuit 74.

Further, it is made possible to realize an incremental encoder employing the phase shift-type position detecting device of this embodiment, by utilizing, as incremental pulse, any one of the lower bits DC0–DC3 of position data outputted from the position detecting device and utilizing, as data indicative of rotational direction, difference value data DV outputted from the difference calculating circuit 72.

Figure 9:
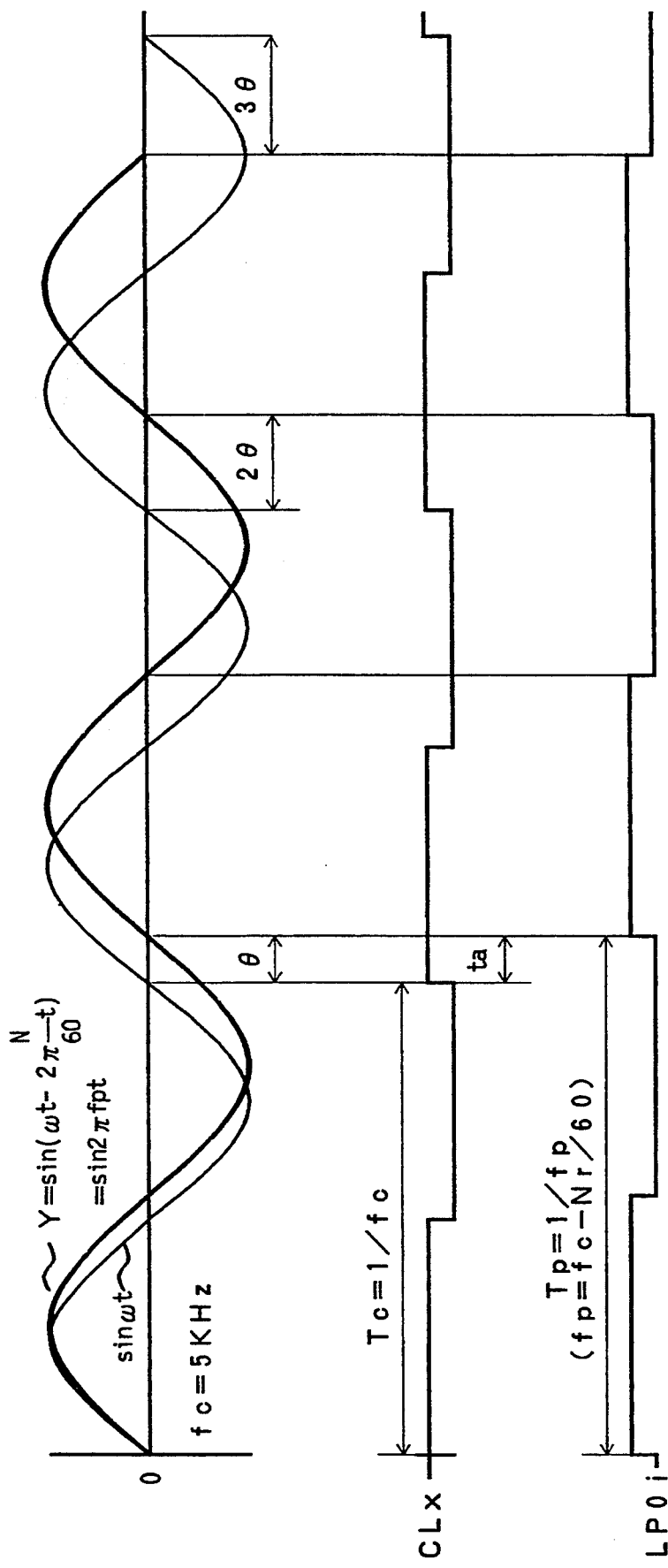
FIG. 9 is a second timing chart explanatory of how the position data generator shown in FIG. 7 operates.
Figure 10:
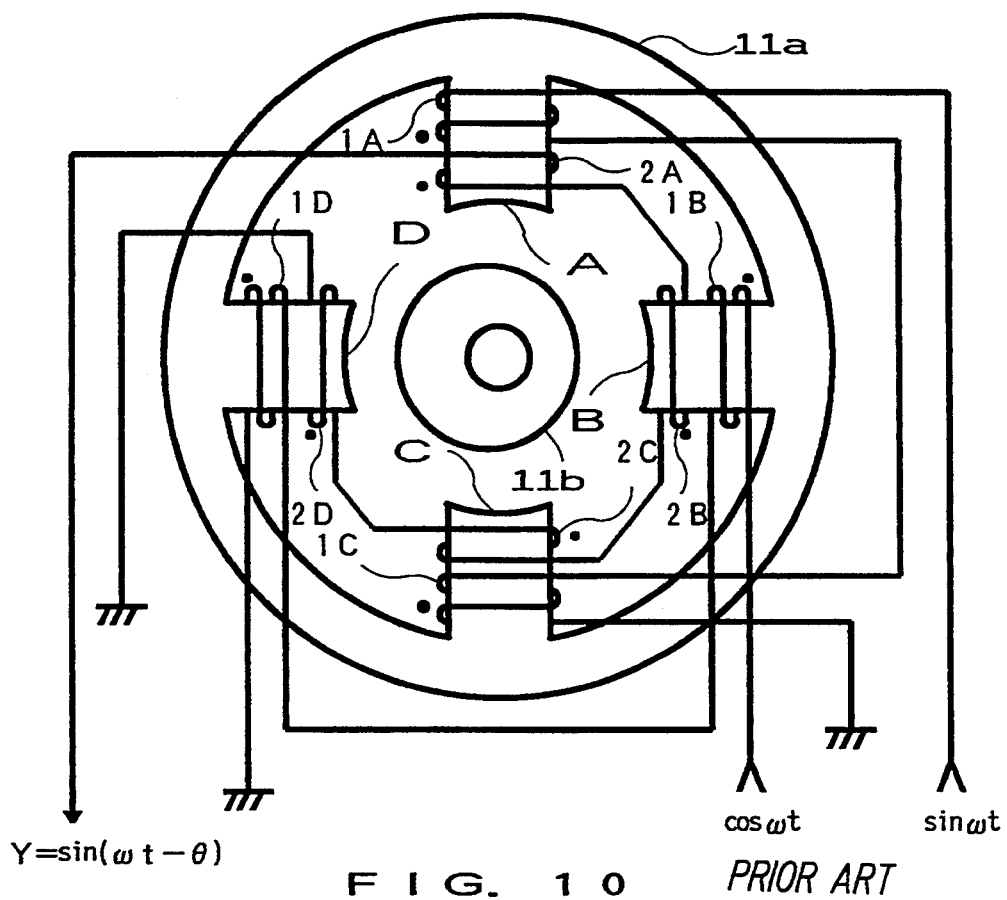
FIG. 10 schematically illustrates an example structure of a prior art phase shift-type rotational position detecting device.

No problem arises when, as in the above-described embodiment, rotation speed of the motor is 12.5 rpm, and period Tp of the latch pulse LP0i and period Tp of the primary carrier frequency fc are substantially constant. Actually however, the period Tp of the latch pulse LP0i is, as shown in FIG. 9, dependent on the rotation speed N and rotation direction of the motor. Namely, as the rotation speed N becomes higher, the period Tp of the latch pulse LP0i becomes sufficiently greater than the period Tc of the primary carrier frequency fc. If the motor is rotated in the opposite direction, then the period Tp of the latch pulse LP0i becomes sufficiently smaller than the period Tc of the primary carrier frequency fc as the rotation speed N becomes higher.

If the motor rotation speed is N rpm, composite output signal $Y = \sin[2\pi fct - 2\pi(N/60)t] = \sin[(2\pi/Tp)t]$, and therefore the period Tp of the latch pulse LPOi is $Tp = 1/(fc - N/60)$ and difference value data DV at this time is $DV = (Nx \times N/60)/(fc - N/60)$. Here, N is a negative value if the motor is rotated in the opposite direction. Thus, by eliminating N from the above formula, $Tp = (Nx + DV)/(fc \times Nx)$ can be obtained, in which Nx represents the division number per rotation. If, for example, the primary carrier frequency fc is 5 KHz and the motor rotation speed N is 30,000 rpm, then the period Tp of the latch pulse LPOi is 222 μs that is greater by ta (about 22 μs) than the period Tc (200 μs)

of the primary carrier frequency fc. If the primary carrier frequency fc is 5 KHz and the motor is rotated in the opposite direction a/speed N of 30,000 rpm, then the period Tp of the latch pulse LPOi is 182 µs that is smaller by ta (about 18 µs) than the period Tc (200 µs) of the primary carrier frequency fc.

For this reason, when the pulse interval converting circuit 73 which has received the difference value data DV provides the pulse generating circuit 76 with pulse interval data PW corresponding to the value obtained by dividing the period Tc by the difference value DV (tc/DV), the position data generating circuit 77 outputs position data one after another for a first 200 µs, but there occurs no change in the position for a time region ta (22 µs). When, on the other hand, the motor is rotated in the opposite direction, it may happen that the position data generating circuit 77 can not complete outputting position data within the period Tp of the latch pulse LPOi.

Thus, in order to allow position data to be output at an equal interval from the position data generating circuit 77 even when the rotation is at such a high speed, the pulse interval converting circuit 73 is set in such a manner that it provides the pulse generating circuit 76 with pulse interval data PW which corresponds to a value obtained by (Tp-Tm)/DV, i.e., by first subtracting a predetermined allowance time Tm (time corresponding to about 1-3% of the one period Tc of the primary carrier frequency, i.e., 5 µs when the primary carrier frequency is 5 KHz and 2.5 µs when the primary carrier frequency is 10 KHz) from the period Tp of the latch pulse LPOi (Tp-Tm) and then dividing the value Tp-Tm by the difference value DV. Here, the allowance time Tm is an allowance time determined in view of the fact that the period Tp of the latch pulse LPOi becomes smaller than the preceding period if the motor is rotated at a reduced speed or rotated in the opposite direction for subsequent acceleration.

Accordingly, if the motor rotation speed N is 30,000 rom, the pulse interval converting circuit 73 outputs pulse interval data PW which corresponds to a value obtained by subtracting 5 µs from the period Tp, about 222 µs of the latch pulse LPOi and then dividing the subtraction result 217 µs by the difference value DV (217 µs/DV). On the other hand, if the motor is rotated in the opposite direction at a speed of 30,000 rom, the pulse interval converting circuit 73 outputs pulse interval data PW which corresponds to a value obtained by subtracting 5 µs from the period Tp, about 182 µs and then dividing the subtraction result 178 µs by the difference value DV (178 µs/DV).

It may be apparent to those skilled in the art that although having been thus far described in connection with a phase shift-type rotational position detecting device, the above-mentioned embodiment is also applicable to phase shift-type linear position detecting devices.

Further, although, in the above-mentioned embodiment, output pulse of the pulse generating circuit 76 has been described as incremental pulse, it may be a matter of course that, if the rotation is in the opposite direction, decremental process from preceding value is performed on the basis of such incremental pulse and interpolation is performed up to current value.

Moreover, although the embodiment has been described as having thirteen delay elements D1-DD, a greater number of delay elements may of course be used so as to further increase the position detection accuracy.

Furthermore, although having been thus far described in connection with a position detecting device, the above-mentioned embodiment, by omitting ROM's 14a, and 14b, D-A converters 15a, 15b, amplifiers 16a, 16b and zero cross circuit 18 from among various components of the position sensor unit of FIG. 1, can also form a time measuring device which is capable of measuring input time of trigger pulse TGP with high accuracy.

As may be readily understood from the foregoing, the position detecting device of the present invention can highly improve the accuracy (resolution) of position data outputted with predetermined periods, so as to detect position of a moving object with maximum accuracy.

Further, the time measuring device can perform time measurements utilizing a unit time smaller than a time corresponding to one count of a counter circuit which counts reference clock signals, so as to measure a time with maximum accuracy.

What is claimed is:

1. A position detecting device which comprises:
a first absolute position detecting means for generating an A.C. output signal having a phase electrically shifted in accordance with a position of a moving object, sampling a counted value of a counter circuit in response to an electrical phase change at a zero cross time point of the A.C. output signal, and outputting the sampled counted value of the counter circuit as absolute position data of the moving object, and
a second absolute position detecting means for generating one or more delayed clock signals delayed from a clock signal on the basis of which said counter circuit counts by an amount of time smaller than one period of the clock signal, for utilizing the one or more delayed clock signals to measure the zero cross time point of the A.C. output signal in accordance with a unit time smaller than the one period of the clock signal, and for outputting, as said absolute position data, the measured time point after having been added to said sampled counted value.

2. A position detecting device as defined in claim 1, in which said first absolute position detecting means comprises:
clock oscillator means for generating a clock signal having a repetition of first and second level changes;
counter means that counts up in response to the first level change of the clock signal;
zero cross detecting means for detecting the zero cross time point of the A.C. output signal to output a predetermined trigger pulse;
latch pulse generator means for outputting a latch pulse in response to first detected one of said second level change since the trigger pulse has been inputted to the latch pulse generator means, and
holding means for holding a value being counted by said counter means when the latch pulse is input to the holding means, and in which
said second absolute position detecting means comprises:
delay means comprising a plurality of delay circuits connected in series with each other, each of said delay circuits outputting a delayed clock signal that is delayed from the clock signal by an amount of time smaller than one period of the clock signal, and high-accuracy position detecting means for receiving the plurality of delayed clock signals from said delay means, and for performing a division of dividing the number of the delayed clock signals having a delay time smaller than the one period of the clock signal and also having said second level change of the clock signal prior to the zero cross time point of the A.C. output signal, by the number of said delayed clock signals having a delay time smaller than the one period of the clock signal, so that the high-accuracy position detecting means outputs, as said absolute position data, a result of the division after having been added to the sample counted value.

3. A position detecting device as defined in claim 2, in which said high-accuracy position detecting means comprises:

a plurality of delayed latch pulse generators for receiving the plurality of delayed clock signals from said delay means, each of said delayed latch pulse generators outputting a delayed latch pulse in response to first detected one of said second level change, since the trigger pulse has been inputted to the delayed latch pulse generator;

pattern holding means for receiving a plurality of the delayed latch pulses from said delay latch pulse generators, detecting levels of the delayed latch pulses, and holding the detected levels as a level pattern comprising data indicative of the delayed latch pulses;

divisor and dividend detecting means for receiving the level pattern from said pattern holding means, and outputting, as said divisor, a number of the level patterns outputted during a time in which the level pattern changes from a first level to a second level and again to the first level and further outputting, as the dividend, the number of the level patterns outputted during the time in which the level pattern changes from the first level to the second level and again to the first level and currently having the first level; and dividing means for performing a division between the divisor and the dividend, and outputting, as said absolute position data, a result of the division after having been added to said counted value.

4. A position detecting device as defined in claim 2, in which said delay means comprises a plurality of gate circuits.

5. A position detecting device as defined in claim 1, in which said absolute position detecting means is rotational position detecting means for detecting a rotational position of the moving object.

6. A position detecting device as defined in claim 1, in which said absolute position detecting means is linear position detecting means for detecting a linear position of the moving object.

7. A position detecting device as defined in claim 1 which comprises:

difference calculating means for calculating a difference between a preceding value and a current value of said absolute position data outputted from said first and second absolute position detecting means at each sampling period;

pulse generating means for subtracting a predetermined allowance time from the sampling period to obtain a predetermined pulse generation time and generating, at an equal interval within the pulse generation time, a specific number of pulses which corresponds to the difference calculated by the difference calculating means, and position data generating means for sequentially outputting, in response to the pulses provided from said pulse generating means, position data between the preceding values and current values of said absolute position data, in order to generate absolute position data without any slip-out.

8. A position detecting device as defined in claim 7 which forms incremental pulse on the basis of the absolute position data outputted from said position data generating means.

9. A position detecting device as defined in claim 1 wherein said second absolute position detecting means comprises:

generating means for generating one or more delayed clock signals delayed from the clock signal on the basis of which said counter circuit counts by an amount of time smaller than one period of the clock signal;

means for utilizing the one or more delayed clock signals to measure the zero cross time point of the A.C. output signal in accordance with a unit time smaller than the one period of the clock signal; and outputting means for outputting, as said absolute position data, the measured time point after having been added to said sampled counted value.

10. A position detecting device as defined in claim 1 wherein said second absolute position detecting means comprises:

a plurality of serially connected delay circuits wherein each of said delay circuits outputs a delayed clock signal.

11. A position detecting device as defined in claim 1 wherein said second absolute position detecting means comprises:

a plurality of delayed latch pulse generators wherein each of the delayed latch pulse generators receives a respective one of the one or more delayed clock signals and outputs a delayed latch pulse; and pattern holding circuit for receiving the delayed latch pulses, detecting a level of the delayed latch pulses and generating a level pattern comprising data indicating the detected levels of the latch pulses.

12. A position detecting device as defined in claim 11 wherein said second absolute position detecting means further comprises:

a divisor and dividend detecting circuit for receiving the level pattern and generating a divisor and dividend; and a dividing circuit for performing a division between the divisor and dividend and outputting a result of the division;

an adding circuit wherein said result of the division is added to said counted value and outputting said absolute position data.

13. A time measuring device for detecting when a trigger pulse is inputted, which comprises:

clock oscillator means for generating a clock signal having a repetition of first and second level changes;

counter means that counts up in response to the first level change of the clock signal;

latch pulse generator means for outputting a latch pulse in response to first detected one of said second level change since the trigger pulse has been inputted to the latch pulse generator means;

holding means for holding a value being counted by said counter means when the latch pulse is inputted to the holding means, and outputting the held value as a part of data indicating when the trigger pulse is inputted;

delay means comprising a plurality of delay circuits connected in series with each other, each of said delay circuits outputting a delayed clock signal that is delayed from the clock signal by an amount of time smaller than one period of the clock signal, and time detecting means for receiving a plurality of the delayed clock signals from said delay means, and for performing a division of dividing the number of the delayed clock signals having a delay time smaller than one period of the clock signal and also having said second level change of the clock signal prior to input timing of the trigger pulse, by the number of said delayed clock signals having a delay time smaller than the one period of the clock signal, so that the time detecting means outputs, as the part of data indicating when the trigger pulse is inputted, a result of the division after having been added to the value held by said holding circuit.

14. A time measuring device as defined in claim 13, in which said time detecting means comprises:

a plurality of delayed latch pulse generators for receiving the plurality of delayed clock signals from said delay means, each of said delayed latch pulse generators outputting a delayed latch pulse in response to first detected one of said second level change since the trigger pulse has been inputted to the respective latch pulse generator;

pattern holding means for receiving a plurality of the delayed latch pulses from said delayed latch pulse generators, detecting levels of the delayed latch pulses, and holding the detected levels as a level pattern of the delayed latch pulses;

divisor and dividend detecting means for receiving the level pattern from said pattern holding means, and outputting, as said divisor, the number of the level patterns outputted during a time in which the level pattern changes from a first level to a second level and again to the first level and further outputting, as the dividend, the number of the level patterns outputted during a time in which the level pattern changes from the first level to the second level and again to the first level and also currently having the first level; and dividing means for performing a division between the divisor and the dividend, and outputting, as the part of data indicating when the trigger pulse is inputted, a result of the division after having been added to said value held by said holding means.

15. A time measuring device as defined in claim 13, in which said delay means comprises a plurality of gate circuits.

* * * * *